US011789589B2

(12) United States Patent
Naito et al.

(10) Patent No.: US 11,789,589 B2
(45) Date of Patent: Oct. 17, 2023

(54) INFORMATION PROCESSING APPARATUS AND INFORMATION PROCESSING METHOD FOR DIVIDING DISPLAY SCREEN FOR DISPLAY OF PLURALITY OF APPLICATIONS

(71) Applicant: SONY GROUP CORPORATION, Tokyo (JP)

(72) Inventors: Masahiko Naito, Tokyo (JP); Akitaka Kimura, Tokyo (JP); Takashi Hemmi, Tokyo (JP); Yuumi Ozawa, Tokyo (JP); Kenji Yokoyama, Tokyo (JP); Hiroaki Adachi, Tokyo (JP); Keishi Tsuchiya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 12 days.

(21) Appl. No.: 17/430,647

(22) PCT Filed: Feb. 22, 2019

(86) PCT No.: PCT/JP2019/006928
§ 371 (c)(1),
(2) Date: Aug. 12, 2021

(87) PCT Pub. No.: WO2020/170461
PCT Pub. Date: Aug. 27, 2020

(65) Prior Publication Data
US 2022/0179525 A1 Jun. 9, 2022

(51) Int. Cl.
*G06F 3/0482* (2013.01)
*G06F 3/0486* (2013.01)

(52) U.S. Cl.
CPC .......... *G06F 3/0482* (2013.01); *G06F 3/0486* (2013.01); *G06F 2203/04803* (2013.01)

(58) Field of Classification Search
CPC ................. G06F 3/0482; G06F 3/0486; G06F 2203/04803; G06F 3/04883; G06F 3/0481; G06F 3/04886
See application file for complete search history.

(56) References Cited

U.S. PATENT DOCUMENTS 9,830,863 B1 * 11/2017 Carrico ................... G09G 5/00
2010/0248788 A1 9/2010 Yook et al.
(Continued)

FOREIGN PATENT DOCUMENTS

CN 102365617 A 2/2012
CN 103853381 A 6/2014
(Continued)

OTHER PUBLICATIONS

International Search Report and Written Opinion of PCT Application No. PCT/JP2019/006928, dated Apr. 23, 2019, 10 pages of ISRWO.

*Primary Examiner* — Jennifer N Welch
*Assistant Examiner* — Kuang F Chen
(74) *Attorney, Agent, or Firm* — CHIP LAW GROUP

(57) ABSTRACT

Usability improvement is achievable with respect to use of screen divisional display of windows of plural applications. Provided is an information processing apparatus including a control unit that displays divisional display information on a display screen as information associated with screen divisional display of windows of plural applications on the display screen, on the basis of a trigger operation, and displays the windows of the plural selected applications on the basis of a following operation for the displayed divisional display information while dividing display of the windows into at least a first region and a second region of the display screen. The following operation includes an opera-
(Continued)

tion that selects the applications for which the screen divisional display is to be executed.

19 Claims, 22 Drawing Sheets

(56)  References Cited

U.S. PATENT DOCUMENTS

| | | | | |
|---|---|---|---|---|
| 2013/0047123 | A1* | 2/2013 | May | G06F 3/04817 |
| | | | | 715/834 |
| 2014/0089831 | A1* | 3/2014 | Kim | G06F 3/04883 |
| | | | | 715/769 |
| 2014/0164990 | A1 | 6/2014 | Kim et al. | |
| 2014/0189566 | A1* | 7/2014 | Kim | G06F 3/013 |
| | | | | 715/773 |
| 2016/0062552 | A1 | 3/2016 | Jeong et al. | |
| 2016/0202852 | A1 | 7/2016 | Park et al. | |
| 2017/0293421 | A1* | 10/2017 | Xue | G06F 3/04883 |
| 2018/0121082 | A1 | 5/2018 | Zhu et al. | |
| 2019/0243516 | A1* | 8/2019 | Shim | G06F 3/04886 |
| 2020/0012378 | A1* | 1/2020 | Kim | H04M 1/72403 |
| 2020/0133487 | A1* | 4/2020 | Zhang | G06F 3/04817 |

FOREIGN PATENT DOCUMENTS

| | | |
|---|---|---|
| CN | 104956301 A | 9/2015 |
| CN | 106537319 A | 3/2017 |
| EP | 2741201 A2 | 6/2014 |
| EP | 3316112 A1 | 5/2018 |
| JP | 2012-521595 A | 9/2012 |
| JP | 2014-116004 A | 6/2014 |
| JP | 2014-157466 A | 8/2014 |
| JP | 2018-535455 A | 11/2018 |
| KR | 10-2010-0107377 A | 10/2010 |
| KR | 10-2014-0073378 A | 6/2014 |
| KR | 10-2016-0026141 A | 3/2016 |
| KR | 10-2016-0045714 A | 4/2016 |
| WO | 2010/110613 A1 | 9/2010 |
| WO | 2014/088310 A1 | 6/2014 |
| WO | 2015/026101 A1 | 2/2015 |
| WO | 2018/076328 A1 | 5/2018 |

* cited by examiner

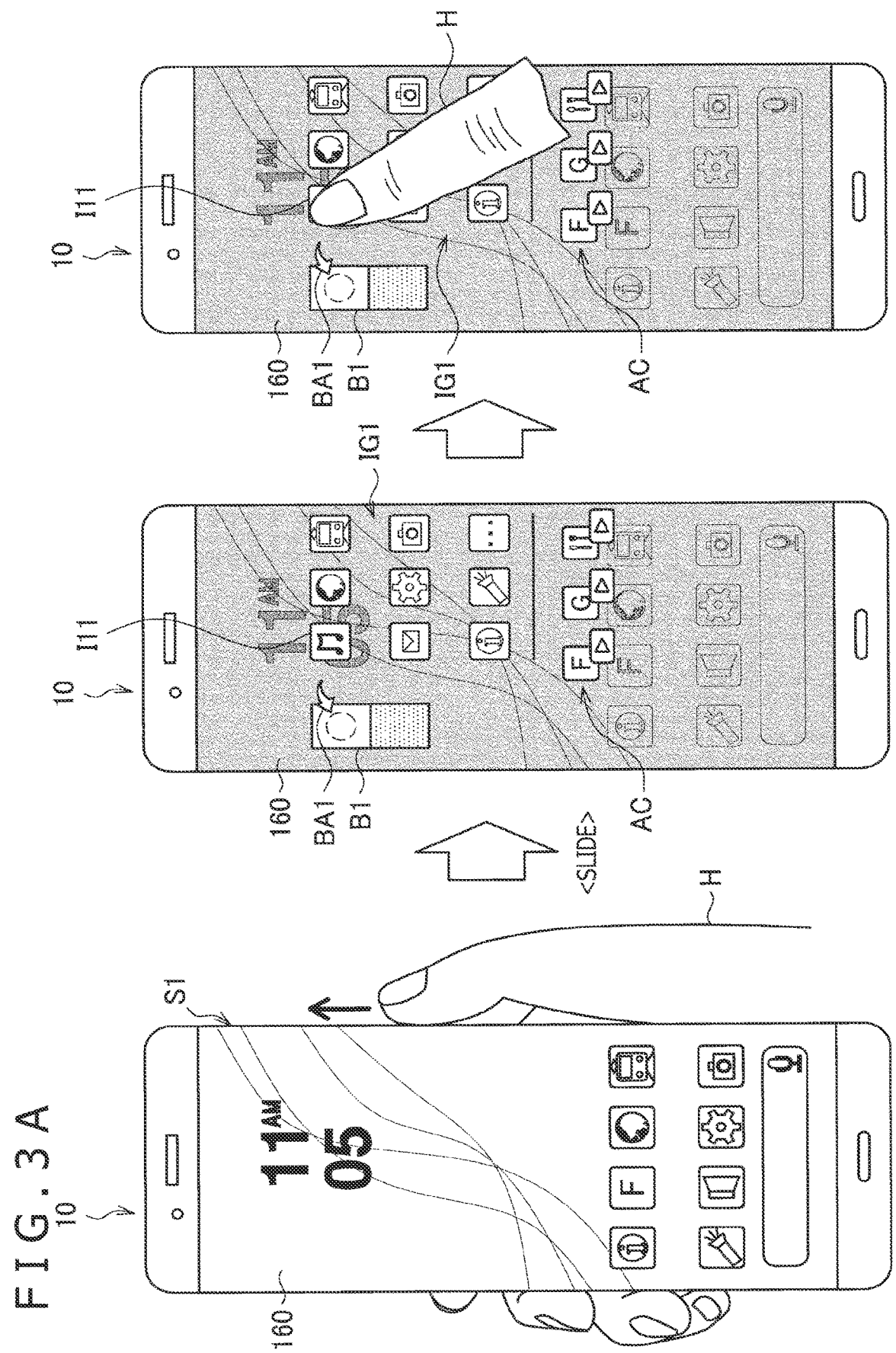

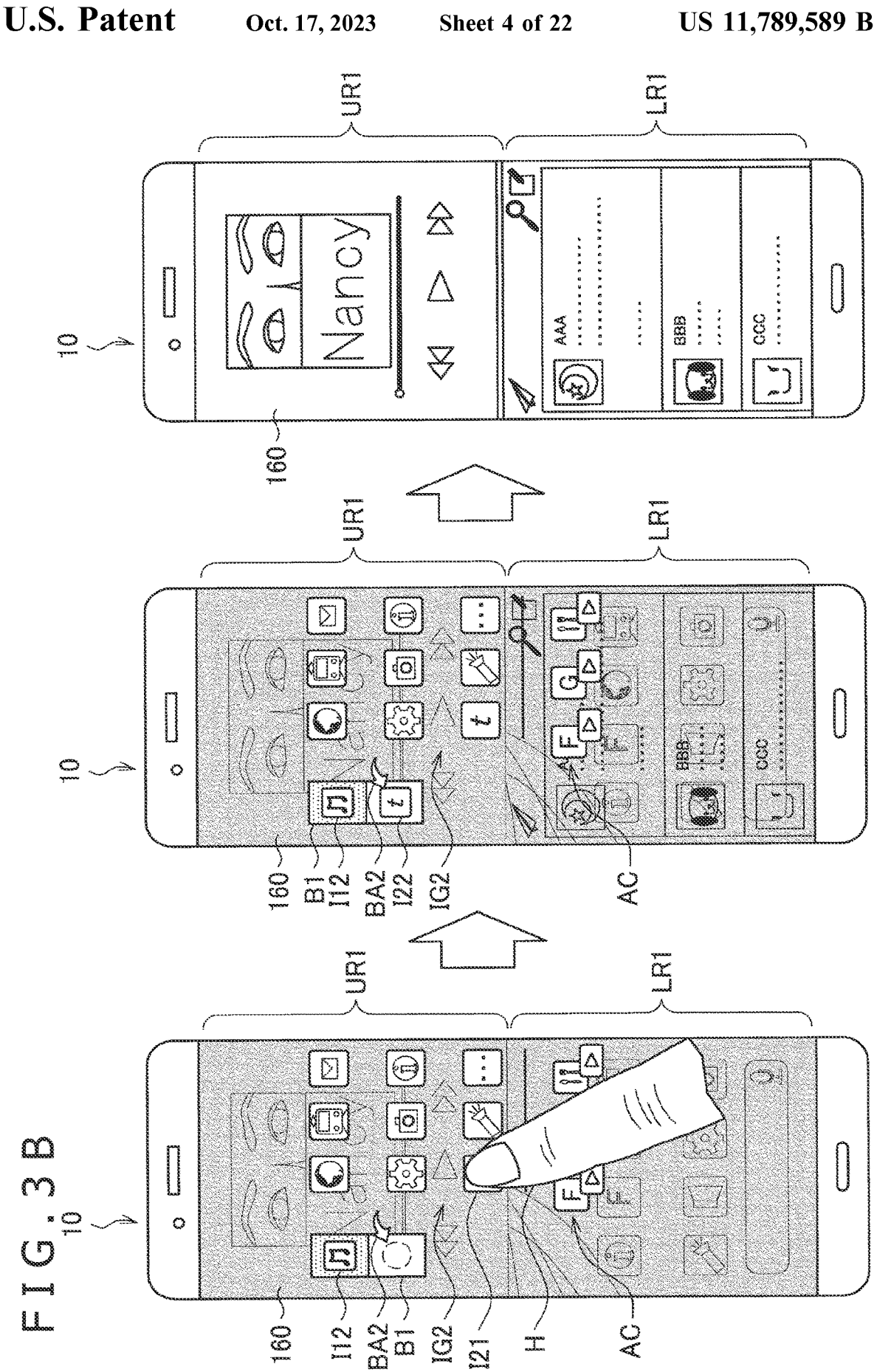

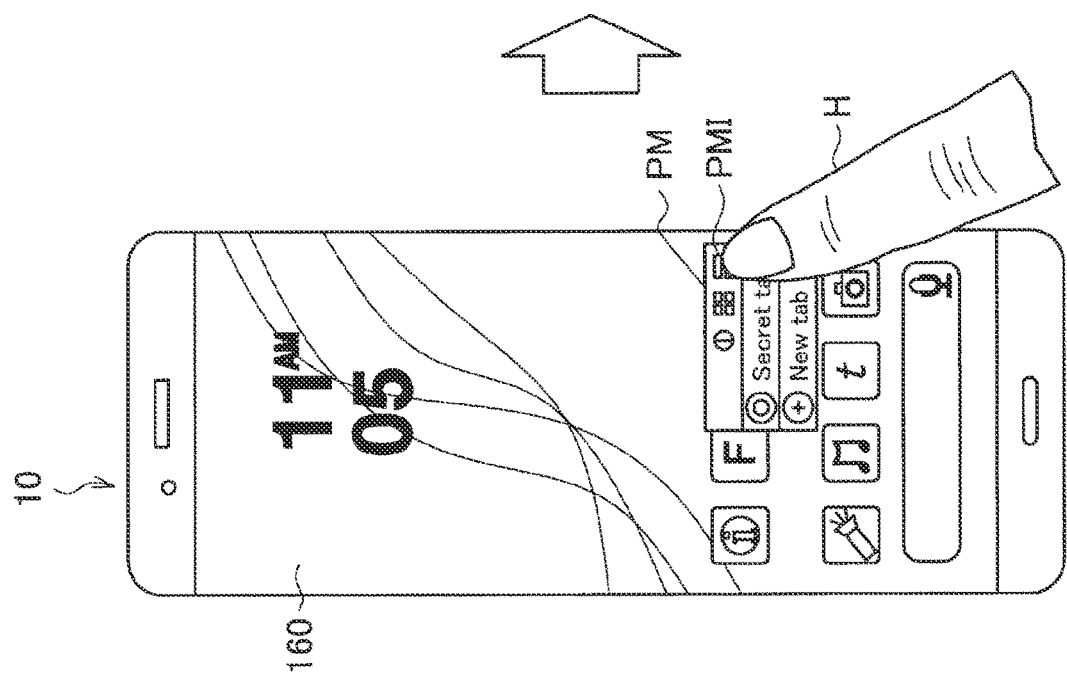
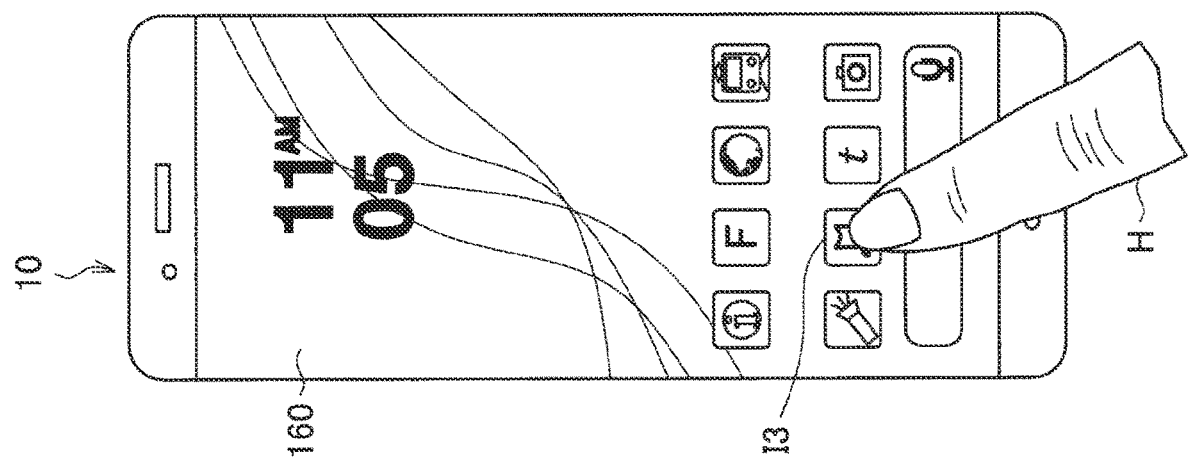
FIG. 4A

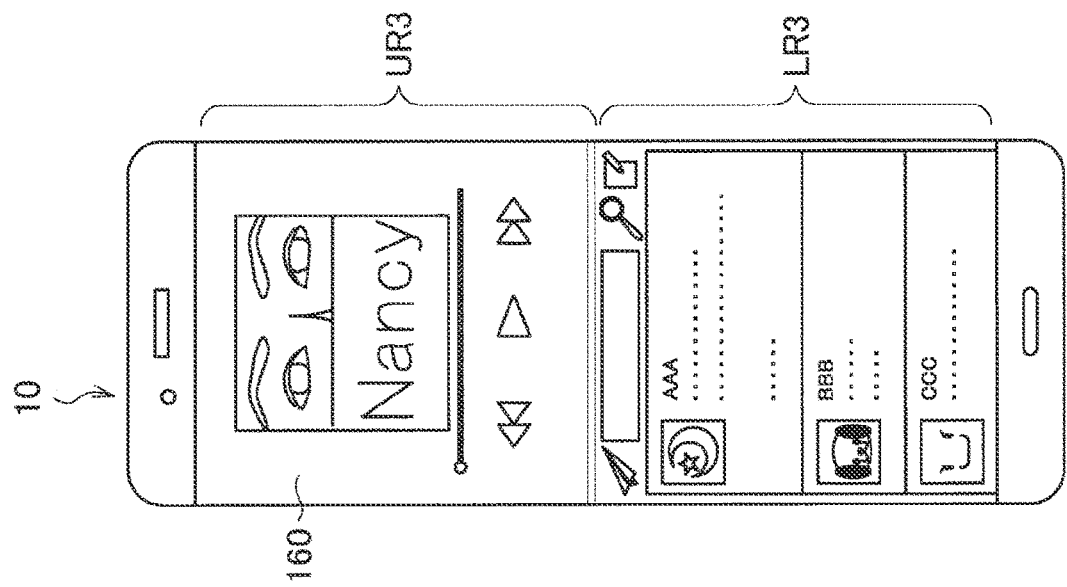
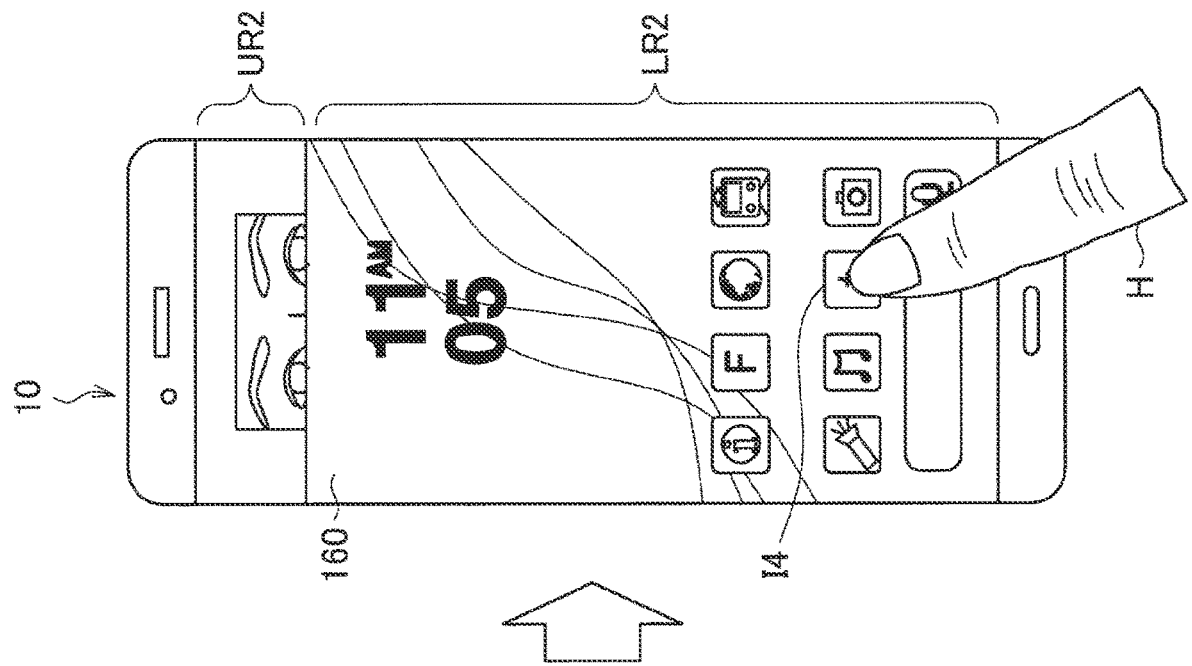
FIG. 4B

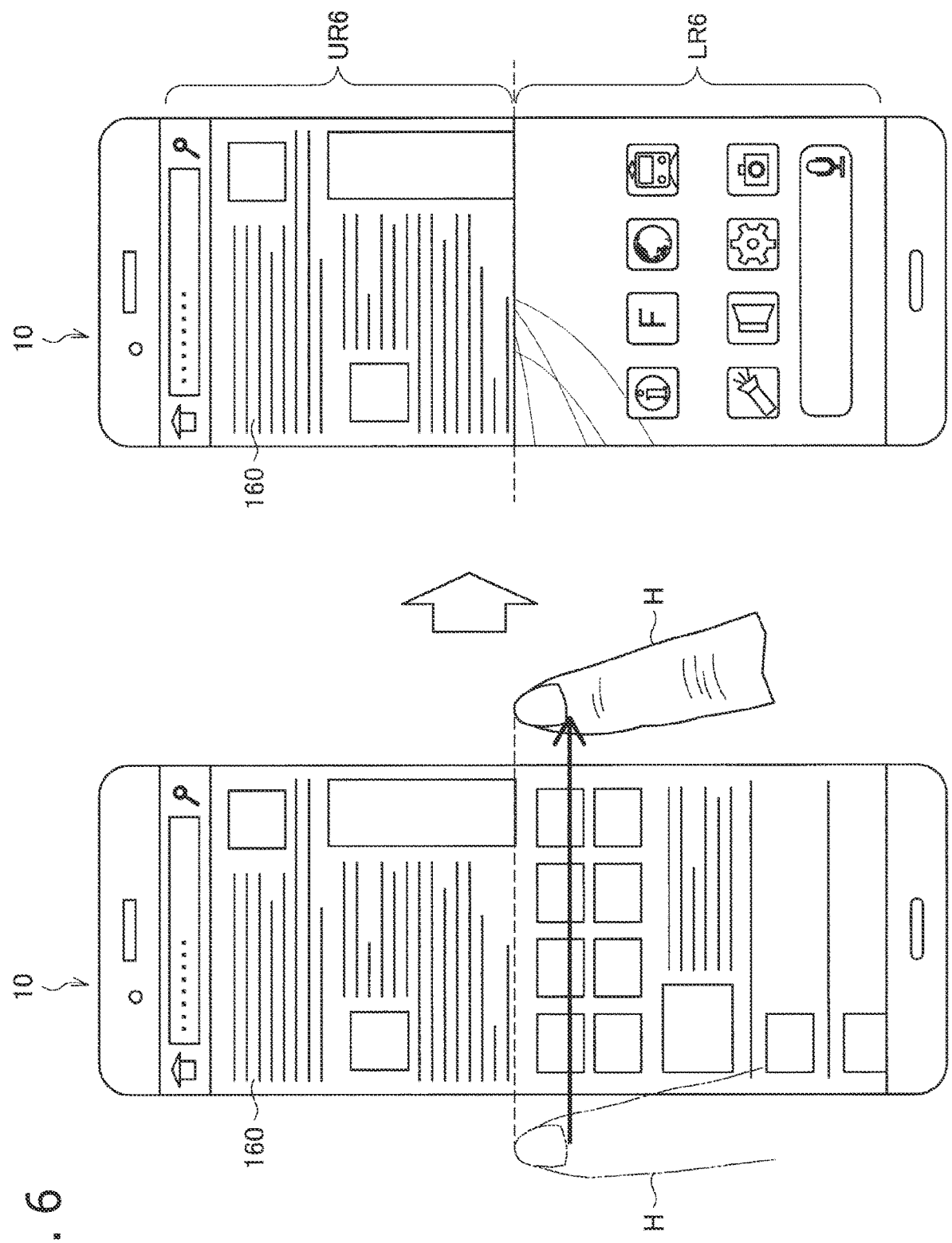

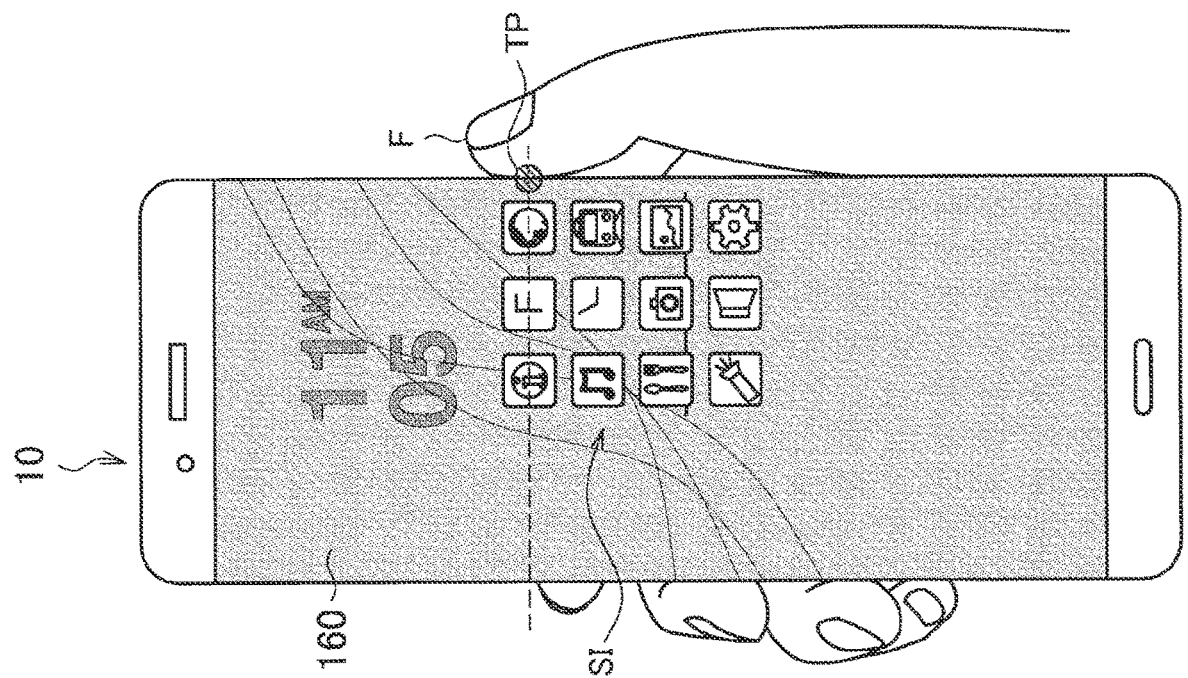
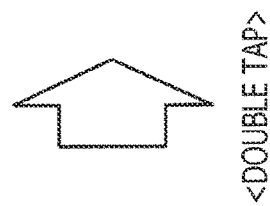
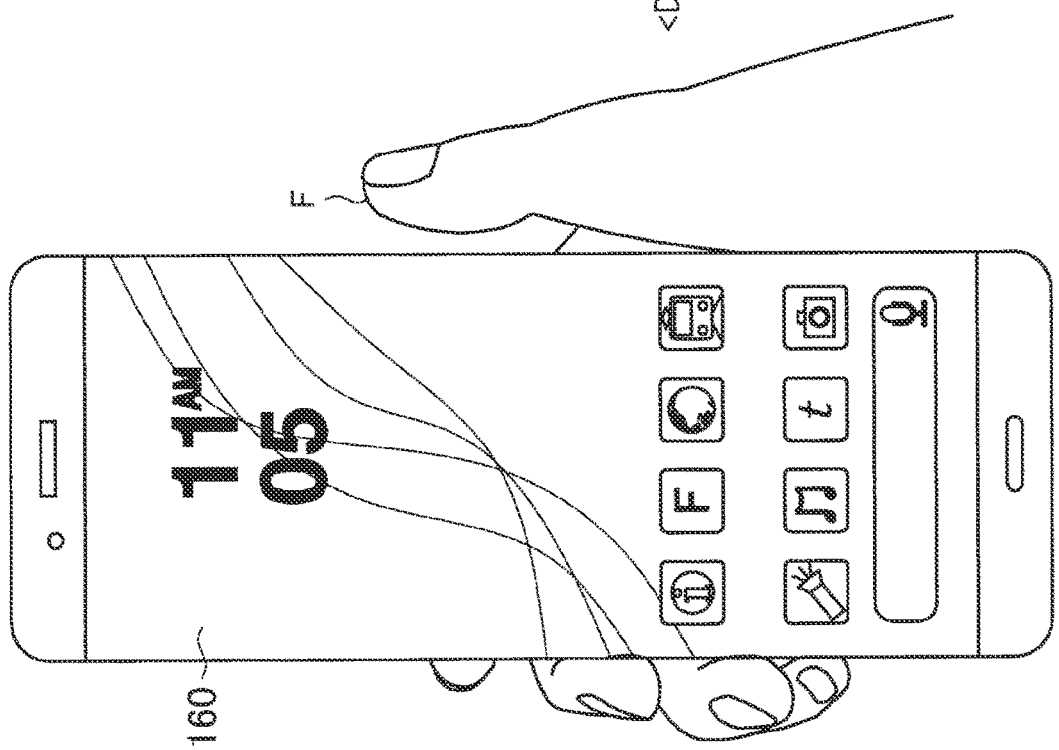
FIG. 7A

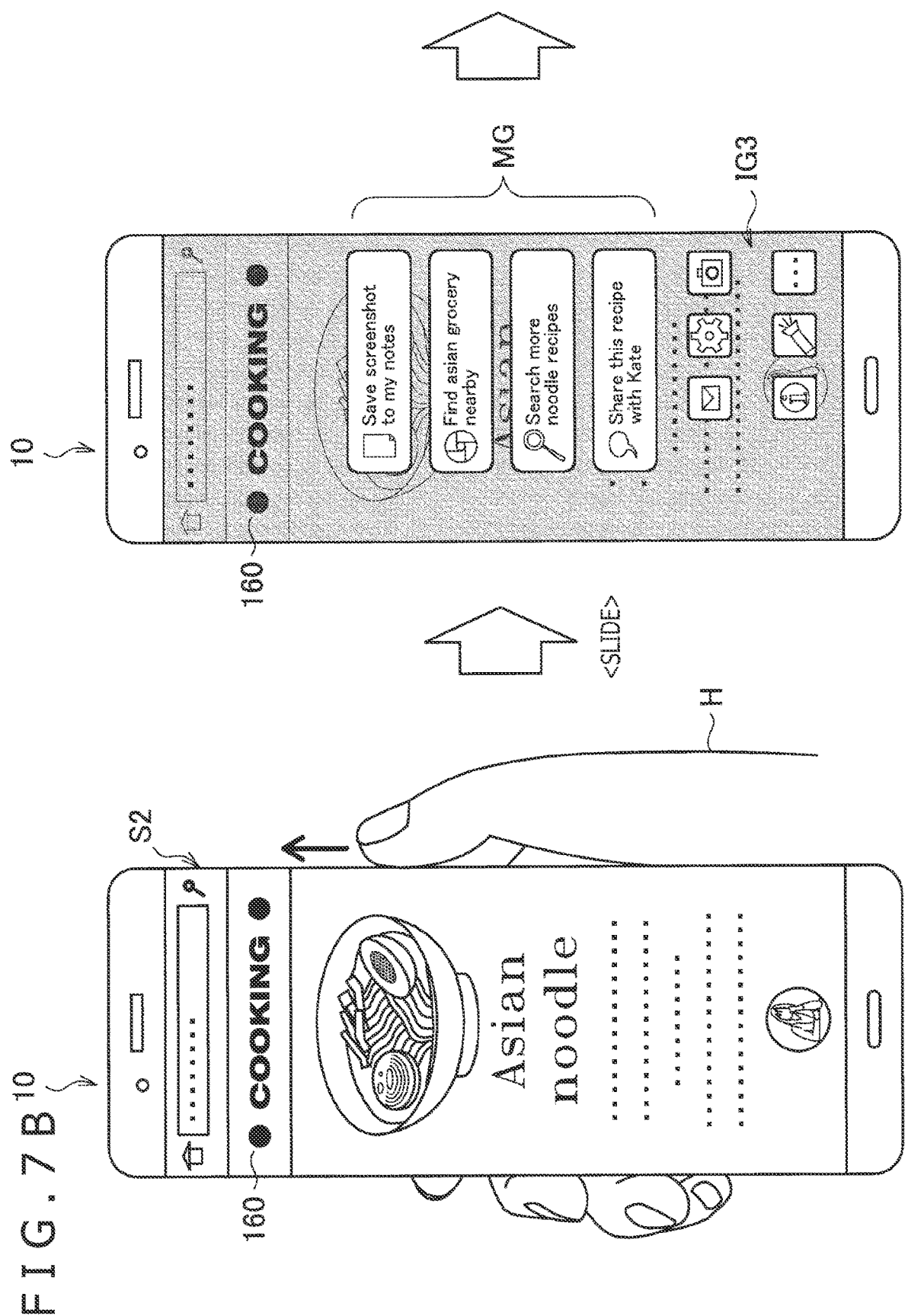

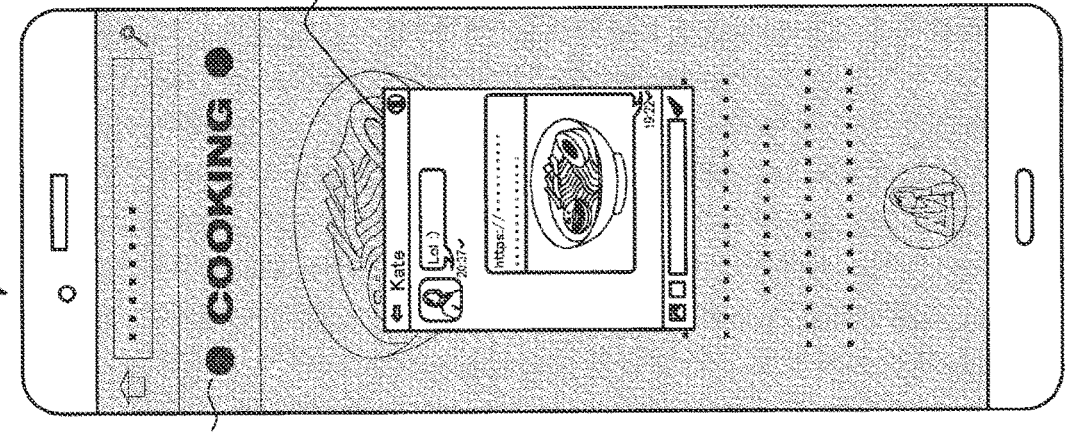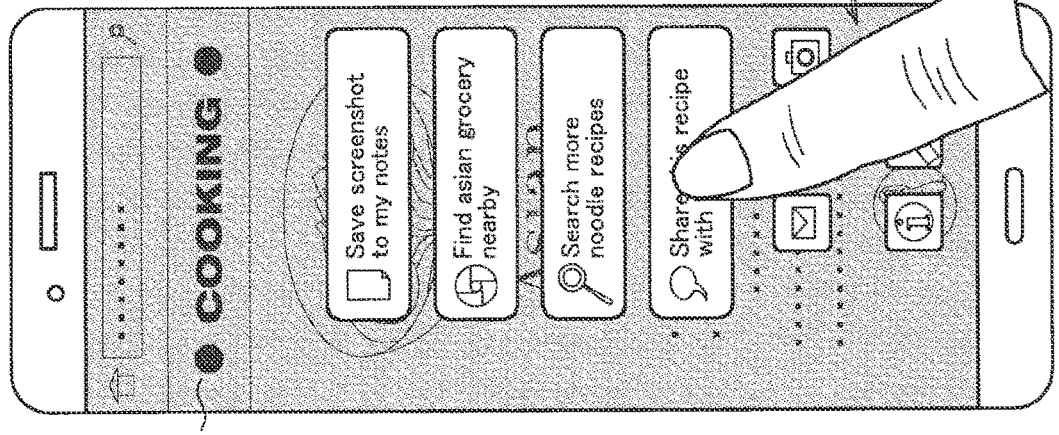
FIG. 7C

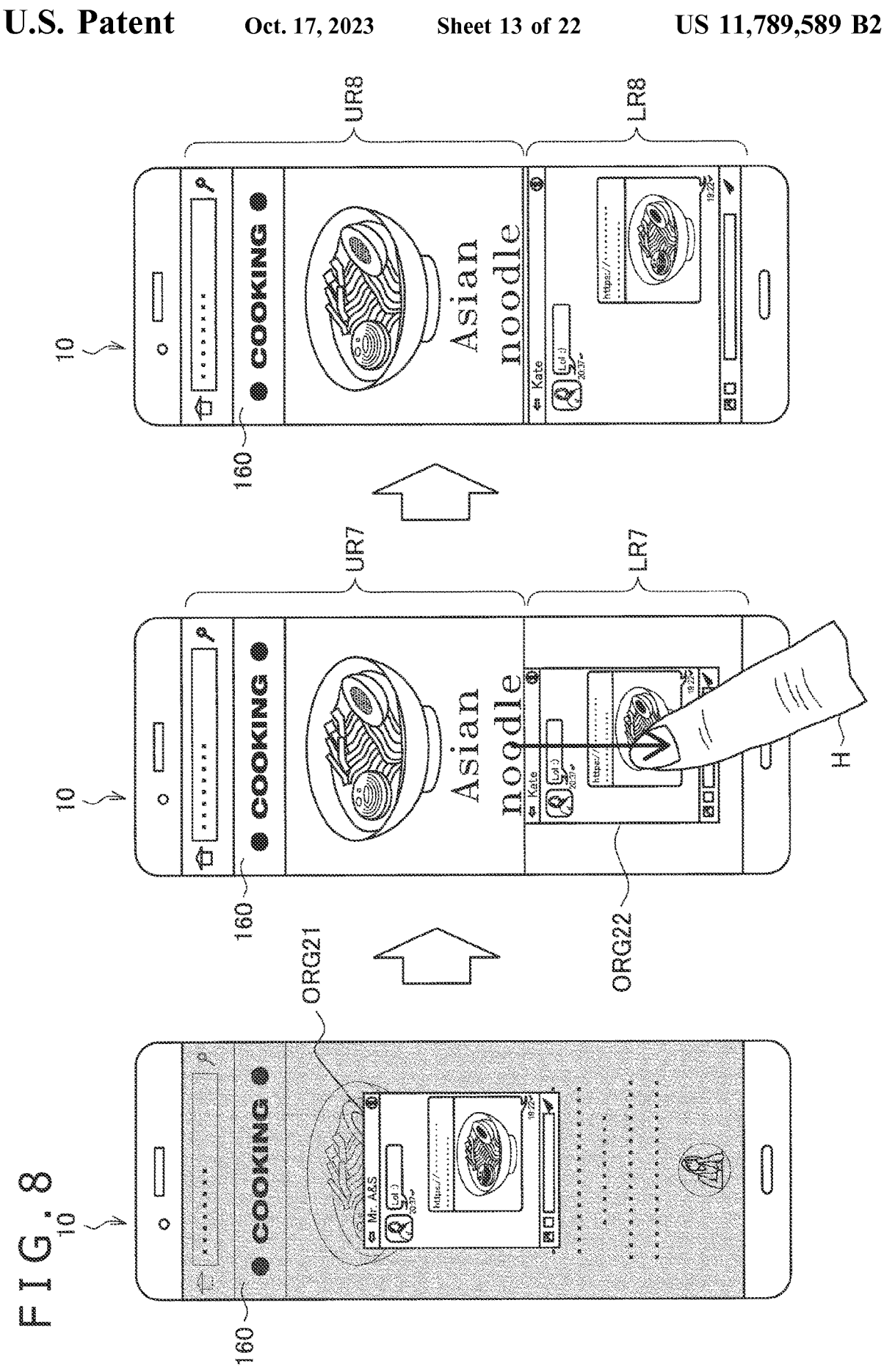

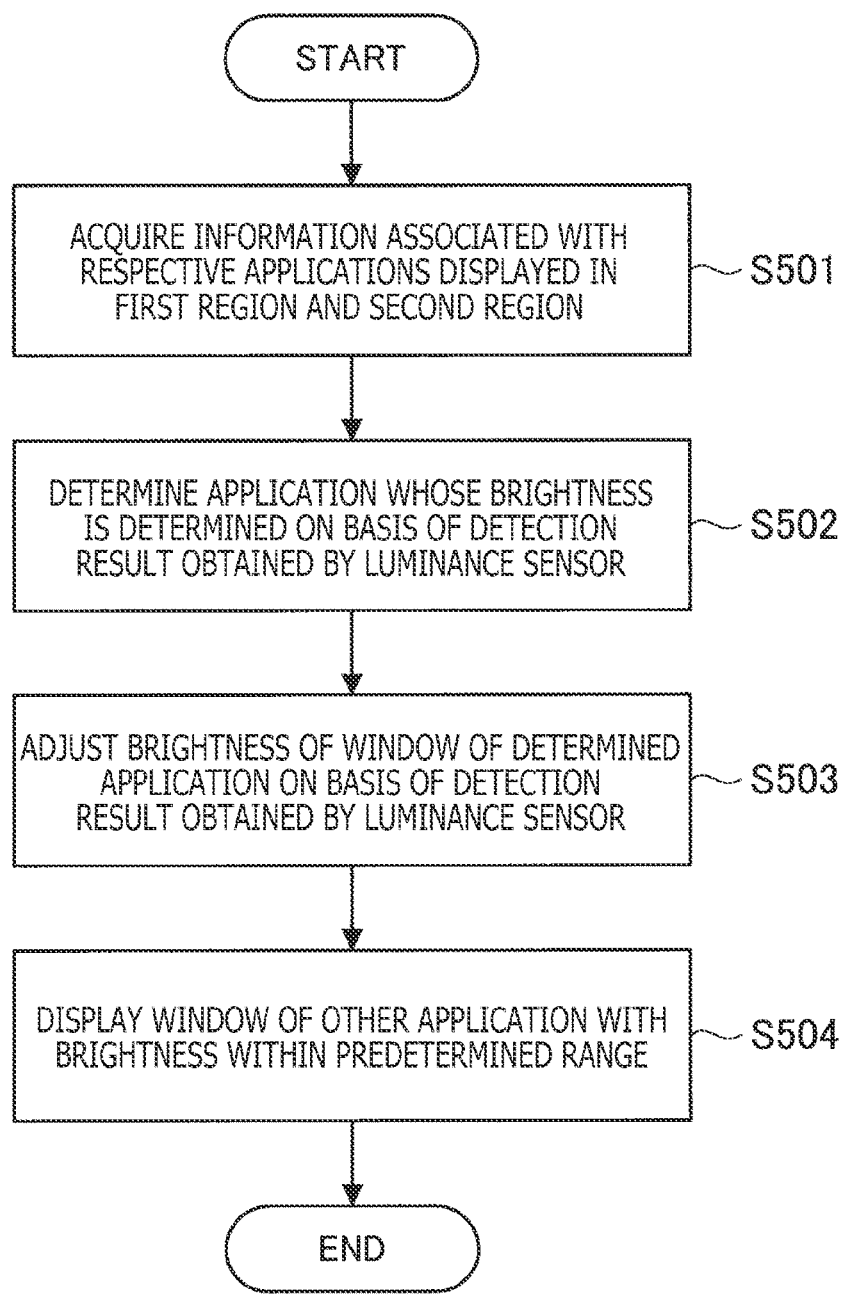

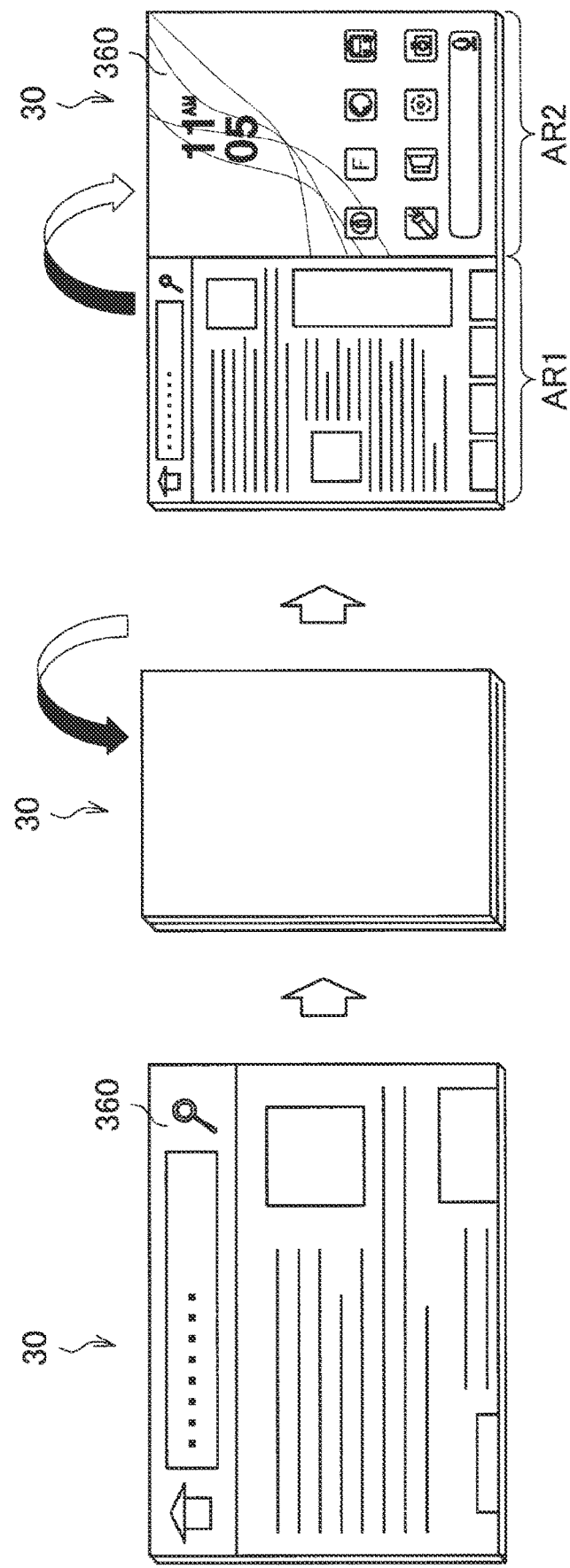

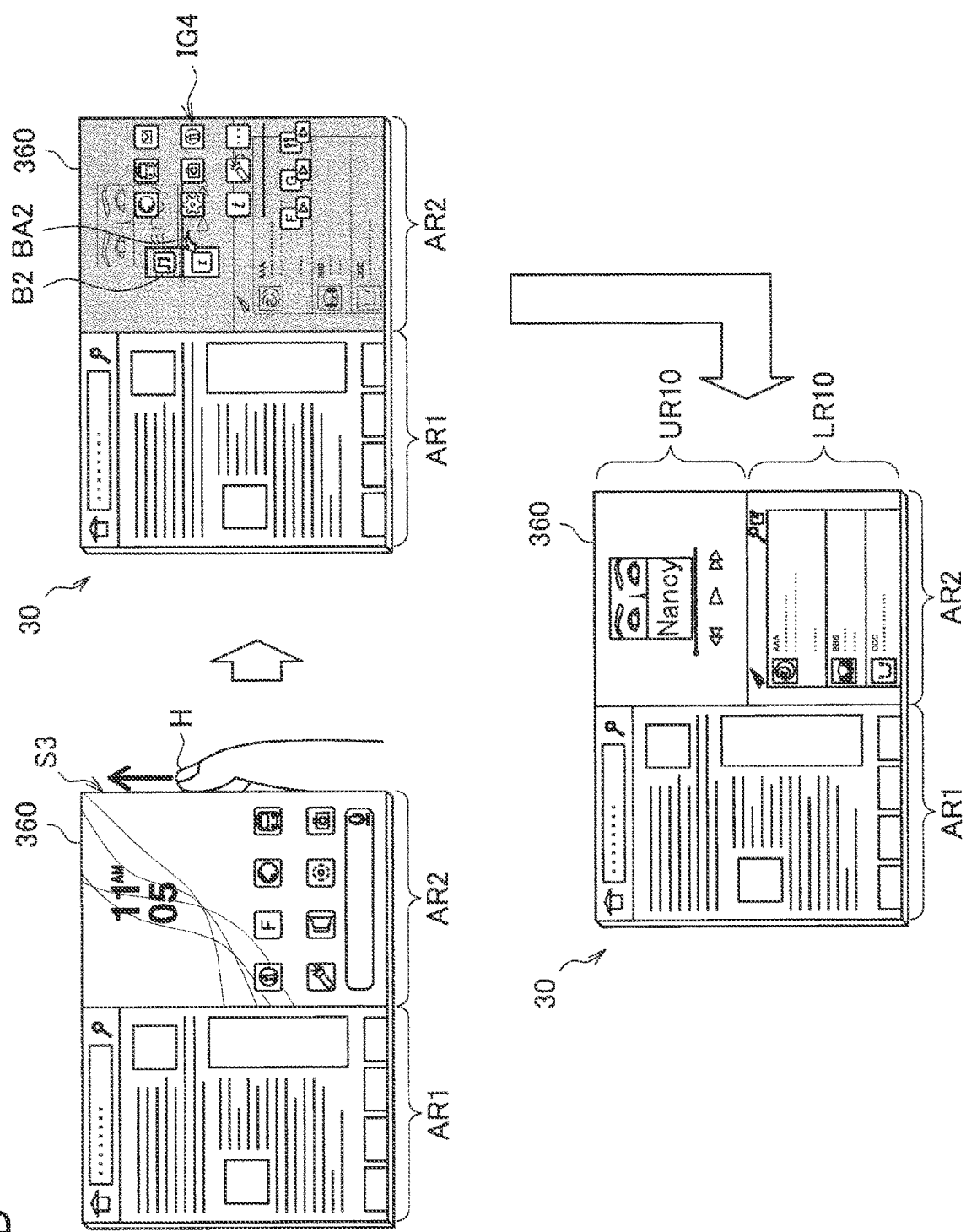

INFORMATION PROCESSING APPARATUS AND INFORMATION PROCESSING METHOD FOR DIVIDING DISPLAY SCREEN FOR DISPLAY OF PLURALITY OF APPLICATIONS

CROSS REFERENCE TO RELATED APPLICATIONS

This application is a U.S. National Phase of International Patent Application No. PCT/JP2019/006928 filed on Feb. 22, 2019. Each of the above-referenced applications is hereby incorporated herein by reference in its entirety.

TECHNICAL FIELD

The present disclosure relates to an information processing apparatus and an information processing method.

BACKGROUND ART

A technology which displays windows of plural applications in one display screen of an apparatus having a touch panel, such as a smartphone, has been developed in recent years. For example, PTL 1 discloses a technology which appropriately activates any one of windows.

CITATION LIST

Patent Literature

[PTL 1]
JP 2014-157466A

SUMMARY

Technical Problem

Meanwhile, for display allowing simultaneous reference to windows of plural applications on a display screen, a user is required to perform an operation which the user may find more complicated than that for display of a window of a single application. Yet, display allowing simultaneous reference to windows of plural applications is not taken into consideration in PTL 1.

Solution to Problem

Provided according to the present disclosure is an information processing apparatus including a control unit that displays divisional display information on a display screen as information associated with screen divisional display of windows of plural applications on the display screen, on the basis of a trigger operation, and displays the windows of the plural applications selected, on the basis of a following operation for the divisional display information displayed, while dividing display of the windows into at least a first region and a second region of the display screen. The following operation includes an operation that selects the applications for which the screen divisional display is to be executed.

In addition, provided according to the present disclosure is an information processing method including displaying, by a processor, divisional display information on a display screen as information associated with screen divisional display of windows of plural applications on the display screen, on the basis of a trigger operation, and displaying the windows of the plural applications selected, on the basis of a following operation for the divisional display information displayed, while dividing display of the windows into at least a first region and a second region of the display screen. The following operation includes an operation that selects the applications for which the screen divisional display is to be executed.

BRIEF DESCRIPTION OF DRAWINGS

FIG. 3A is a diagram for explaining an example of screen divisional display control performed by a control unit 150 for controlling divisional display of windows of plural applications, according to the embodiment.

FIG. 3B is a diagram for explaining the example of screen divisional display control performed by the control unit 150 for controlling divisional display of windows of plural applications, according to the embodiment.

FIG. 4A is a diagram for explaining an example of display control performed by the control unit 150 for controlling display of windows of plural applications, according to the embodiment.

FIG. 4B is a diagram for explaining the example of display control performed by the control unit 150 for controlling display of windows of plural applications, according to the embodiment.

FIG. 6 is a diagram for explaining an example of determination control performed by the control unit 150 for determining a first region and a second region of a display screen while designating a screen division line as a boundary between the first and second regions, according to the embodiment.

FIG. 7A is a diagram for explaining an example of display control performed by the control unit 150 for controlling display of a window of one application, according to the embodiment.

FIG. 7B is a diagram for explaining an example of screen divisional display control performed by the control unit 150 on the basis of an overlay image, according to the embodiment.

FIG. 7C is a diagram for explaining the example of screen divisional display control performed by the control unit 150 on the basis of an overlay image, according to the embodiment.

FIG. 8 is a diagram for explaining an example of screen divisional display control performed by the control unit 150 on the basis of an overlay image, according to the embodiment.

FIG. 14 is a diagram for explaining an example of a flow of an operation associated with brightness adjustment performed by the control unit 150 for the first region and the second region, according to the embodiment.

FIG. 15A is a diagram for explaining a modification according to the embodiment.

FIG. 15B is a diagram for explaining the modification according to the embodiment.

DESCRIPTION OF EMBODIMENT

Figure 1:
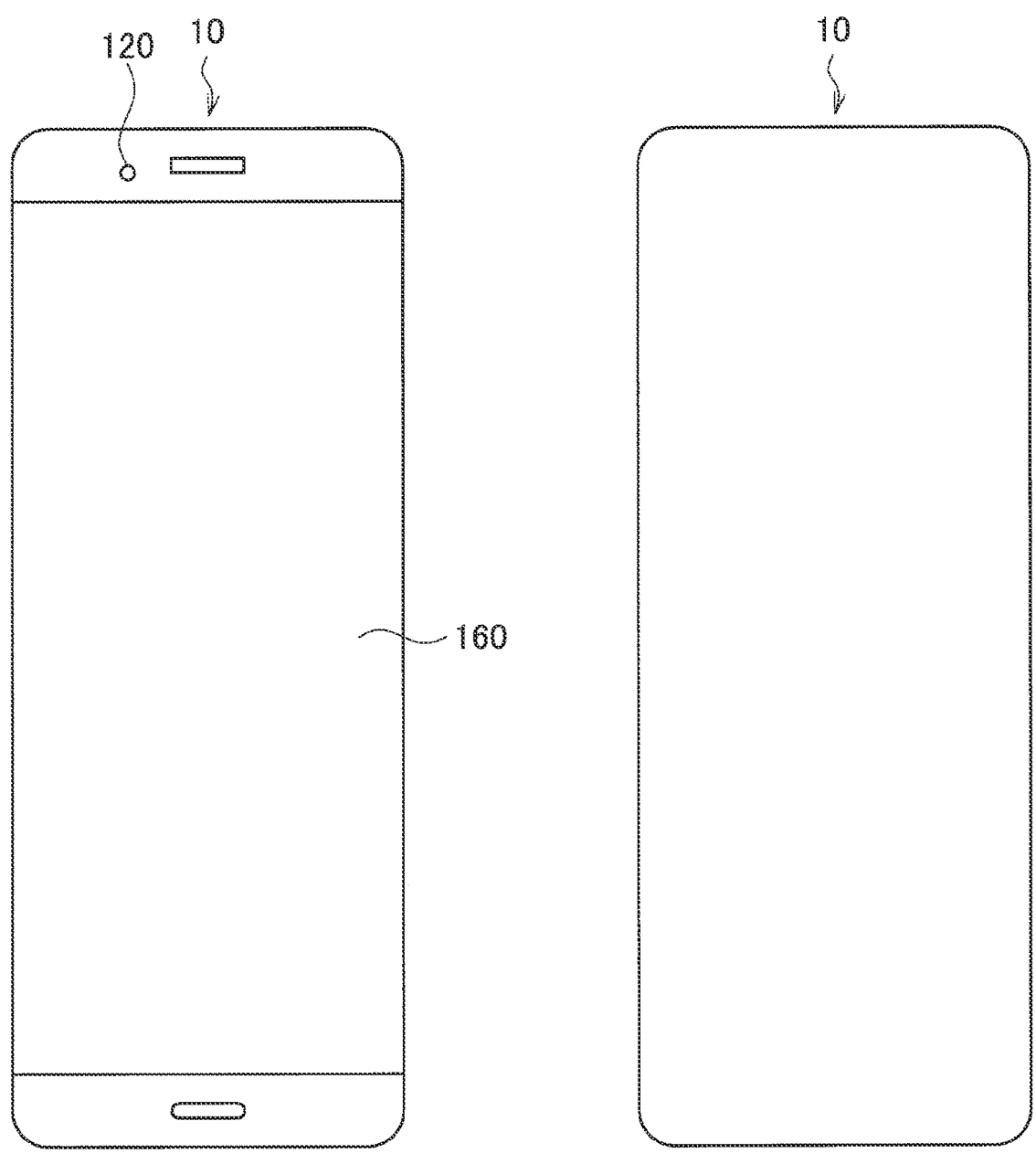
FIG. 1 is a diagram depicting an example of an external configuration of an information processing terminal 10 of the present disclosure.

A preferred embodiment of the present disclosure will hereinafter be described in detail with reference to the accompanying drawings. Note that constituent elements having substantially identical functional configurations will be given identical reference signs in the present description and the drawings to omit repetitive explanation.

Note that the description will be presented in the following order.

1. Background
2. Embodiment
  2.1. External configuration diagram of information processing terminal 10
  2.2. Functional configuration example of information processing terminal 10
  2.3. Specific examples
    2.3.1. Display control example 1
    2.3.2. Display control example 2
    2.3.3. Display control example 3
    2.3.4. Display control example 4
    2.3.5. Display control example 5
    2.3.6. Display control example 6
  2.4. Operation examples
    2.4.1. Operation example 1
    2.4.2. Operation example 2
    2.4.3. Operation example 3
    2.4.4. Operation example 4
    2.4.5. Operation example 5
  2.5. Modification
3. Hardware configuration example
4. Summary

1. Background

The background of the present disclosure will first be described. A technology relating to screen divisional display of windows of plural applications on an apparatus having a touch panel, such as a smartphone, has been developed in recent years. For example, this technology allows a person to exchange opinions with other persons through statements concerning contents of a video with use of a chat application while watching and listening to the video with use of an application provided by a video site.

Meanwhile, according to PTL 1 described above, for display allowing simultaneous reference to windows of plural applications on a display screen, a user executes a larger number of operations than that in a case of display of a window of a single application. For example, the user is required to perform such operations as adjustment of display positions of windows of plural applications on the display screen to avoid overlaps between the respective display positions after display of the windows of the plural applications on the display screen. Moreover, for example, in a case of use of a function of divisional display of the display screen to allow simultaneous reference to windows from initial display, the user also performs a larger number of operations than that in the case of display of a screen of a single application. Accordingly, the user is highly likely to find the operation complicated and troublesome or have difficulty in intuitively understanding the operation method.

The present disclosure has been developed in consideration of the abovementioned circumstances. An object of the present disclosure is to improve usability of use of screen divisional display for windows of plural applications by performing display control which allows intuitive execution of operations associated with screen divisional display of the windows of the plural applications.

2. Embodiment

2.1. External Configuration Diagram of Information Processing Terminal 10

FIG. 1 is a diagram depicting an example of an external configuration of an information processing terminal 10 of the present disclosure. A left part of FIG. 1 depicts a front face of the information processing terminal 10. On the other hand, a right part of FIG. 1 depicts a rear face of the information processing terminal 10. For example, the information processing terminal 10 is a smartphone. Alternatively, the information processing terminal 10 may be a tablet terminal.

The information processing terminal 10 includes a display 160. The display 160 spreads over a sensor unit 110 described later. The information processing terminal 10 thus configured is capable of detecting contact between a finger of a user and the display 160. Note that the display 160 may spread over either a part or the whole of a side face of the information processing terminal 10.

Moreover, the information processing terminal 10 is capable of controlling contents of a display screen on the basis of a user input. For example, the information processing terminal 10 is capable of displaying divisional display information associated with screen divisional display of applications on the display 160, with use of what is generally called a GUI (Graphical User Interface). For example, the divisional display information here refers to information which urges a user U to select an icon corresponding to a predetermined application or an application for displaying a window.

Note that the information processing terminal 10 may include a luminance sensor as a part of an input unit 120 as depicted in the left part of FIG. 1.

2.2. Functional Configuration Example of Information Processing Terminal 10

Figure 2:
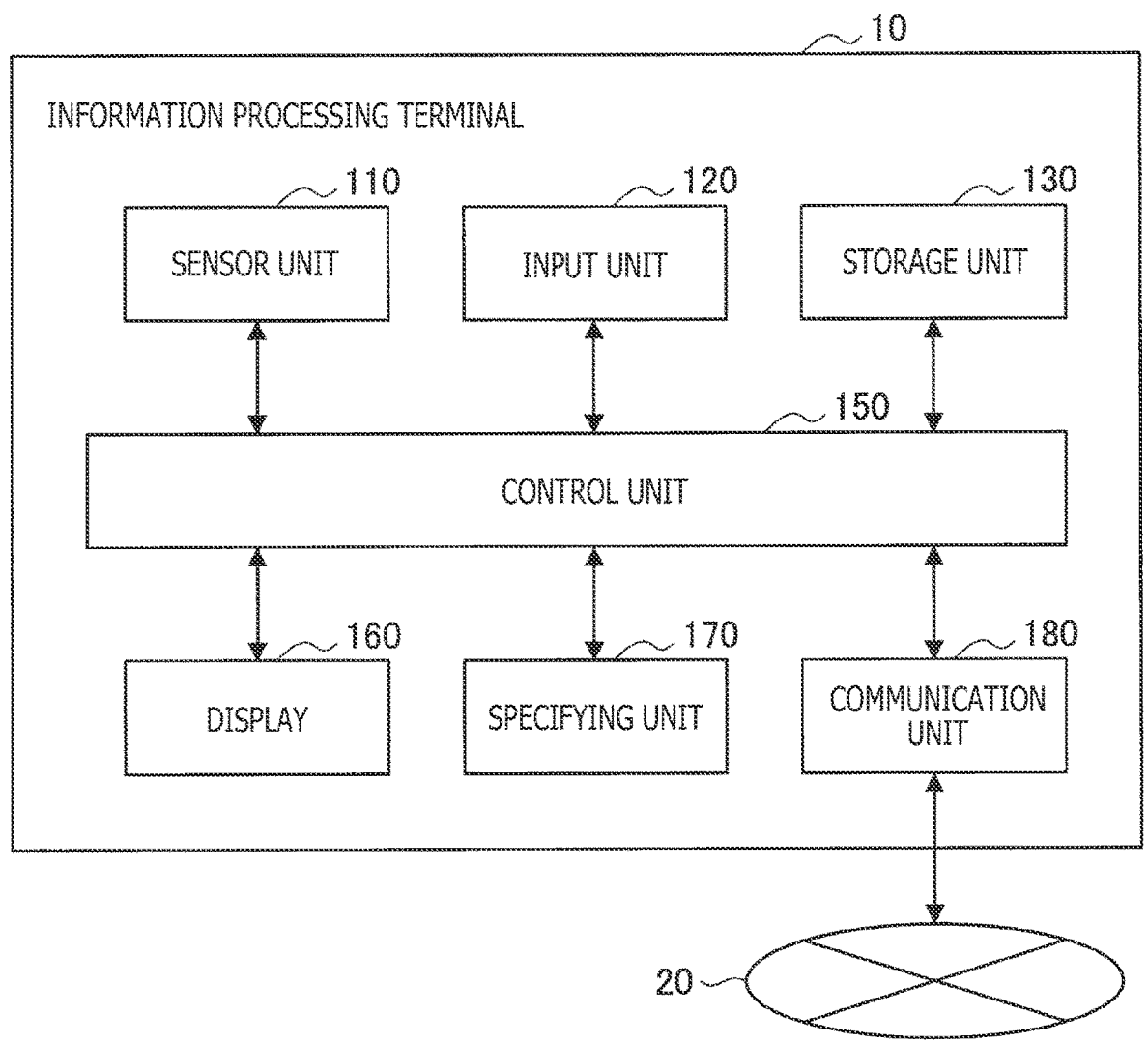
FIG. 2 is a diagram for explaining an example of a functional configuration of the information processing terminal 10 according to the present embodiment.

An example of a functional configuration of the information processing terminal 10 according to the present embodiment will next be described. FIG. 2 is a diagram for explaining an example of the functional configuration of the information processing terminal 10 according to the present embodiment. As depicted in FIG. 2, the information processing terminal 10 is an information processing apparatus which includes the sensor unit 110, the input unit 120, a storage unit 130, a control unit 150, a display 160, a specifying unit 170, and a communication unit 180.

(Sensor Unit 110)

The sensor unit 110 according to the present embodiment has a function of detecting contact between a finger of the user and the information processing terminal 10. The sensor unit 110 is capable of detecting an operation performed by a hand of the user for the front face and the side face of the information processing terminal 10. Note that the sensor unit 110 is implemented by a capacitive-type touch sensor or a pressure-sensitive-type touch sensor, for example.

In addition, in the case of the capacitive-type touch sensor, an operation using the side face of the information processing terminal 10 may be achieved by using a touch sensor that is disposed immediately below the front face of the information processing terminal and that has high sensitivity to a direction of the side surface, instead of using a touch sensor disposed immediately below a side face portion of the information processing terminal 10. In this case, the operation using the side surface is achieved by setting higher sensitivity to the side face portion of the information processing terminal 10 than sensitivity of touch sensors for other regions.

Moreover, the sensor unit 110 is capable of detecting a trigger operation performed by the user. The trigger operation here refers to an operation performed to display windows of applications with screen division. In addition, the trigger operation specifically refers to a double tap, a slide, a swipe, or the like.

(Input Unit 120)

For example, the input unit 120 according to the present embodiment includes various types of sensors such as a luminance sensor, an acceleration sensor, and a position information sensor, and has a function of acquiring data with use of the various types of sensors. The input unit 120 may provide acquired data to the control unit 150 and the specifying unit 170 described later. For example, luminance information detected by the luminance sensor is used for an adjustment process performed by the control unit 150 for adjusting brightness of a display screen of the display 160.

(Storage Unit 130)

The storage unit 130 according to the present embodiment is a storage region for temporarily or permanently storing various types of programs and data. For example, the storage unit 130 may store information associated with various types of applications. Specifically, the storage unit 130 may store programs for executing applications, management data for managing various types of settings and the like, and others. Needless to say, the above specific examples are presented only by way of example. The types of data to be stored by the storage unit 130 are not limited to particular data.

(Control Unit 150)

The control unit 150 has a function of controlling respective configurations included in the information processing terminal 10 according to the present embodiment. For example, the control unit 150 controls starting and stopping of the respective configurations.

Moreover, the control unit 150 has a function of displaying divisional display information on the display screen as information associated with screen divisional display of windows of plural applications on the display screen, on the basis of a trigger operation, starting applications not originally started in plural selected applications, on the basis of a following operation for the displayed divisional display information, and displaying the windows of the plural selected applications while dividing display of the windows into at least a first region and a second region of the display screen. As described above, for example, the divisional display information is information which presents, to the user U, a list of icons corresponding to predetermined applications or applications for displaying windows.

For example, the trigger operation is a slide operation performed for the side face of the display screen, a long press operation performed for an icon displayed on the display screen, or the like. The control unit 150 causes the display 160 to display divisional display information corresponding to a trigger operation performed by the user U and detected by the sensor unit 110. In addition, the following operation here is an operation performed for the divisional display information displayed by the trigger operation, as an operation for selecting the applications for which screen divisional display is to be executed. The control unit 150 causes the display 160 to display a window of a predetermined application in the first region or the second region of the display screen on the basis of the following operation detected by the sensor unit 110. In addition, in a case of causing the display 160 to start display of a window of an application not originally started, the control unit 150 first executes a process for starting this application. Note that the applications for which screen divisional display is to be executed may be selected on the basis of not only the following operation but also the trigger operation as described later.

Each of the first region and the second region is a predetermined region within the display screen displayed by the display 160. For example, the first region may be a region in an upper part of the display screen, while the second region may be a region different from the first region, i.e., a lower part of the display screen. Note that the control unit 150 may change the sizes of the first region and the second region on the basis of an operation by the user U, for example, after display of the windows of the applications in the first region and the second region. Moreover, in a case where two applications are arranged in the left-right direction of the display 160 with the information processing terminal 10 in a landscape orientation, the display screen may similarly be divided into the first region and the second region. For example, a left region of the display 160 may be defined as the first region, while a right region may be defined as the second region.

A specific example of display control performed by the control unit 150 for controlling display of windows of plural applications will be described later.

(Display 160)

The display 160 according to the present embodiment is a touch panel which has a function of displaying divisional display information and windows of applications on the display screen, under control by the control unit 150.

(Specifying Unit 170)

The specifying unit 170 according to the present embodiment has a function of specifying a predetermined application on the basis of a predetermined reference. For example, the predetermined reference here refers to a current time, a current place, use frequencies of various types of applications, and others. For example, the specifying unit 170 may specify an application more frequently used than other applications in the various types of applications stored in the storage unit 130.

Moreover, the specifying unit 170 may specify an application by using a model constructed by machine learning of an operation performed by the user for the information processing terminal 10, or of the predetermined reference. For example, the machine learning may be machine learning using a neural network such as deep learning. Note that the constructed model may be stored in the storage unit 130. At this time, the specifying unit 170 may individually specify an application to be displayed in the first region and an application to be displayed in the second region, by using machine learning for each. These applications are individually specified for the following reason. In a case where two applications are arranged on the display 160 in the up-down direction, for example, there is a possibility that an application desired to be arranged on the upper side by the user is different from an application desired to be arranged on the lower side by the user. Similarly, in a case where two applications are arranged in the left-right direction on the display 160 with the information processing terminal 10 in a landscape orientation, an application to be displayed in the left region and an application to be displayed in the right region may individually be specified using machine learning for each.

Further, in a case where there is an application whose window is determined to be displayed in the first region by the control unit 150, the specifying unit 170 may specify a different application on the basis of the application. For example, the different application here is an application highly likely to be displayed in the second region when a window of a predetermined application is displayed in the first region. At this time, the application may also be specified using a model constructed by machine learning. Further, the specifying unit 170 may specify two applications that are frequently combined at the time of use, by using machine learning or the like.

Further, the specifying unit 170 may specify an application on the basis of information obtained by machine learning from data received from other apparatuses via a network 20 described later, as data associated with terminal use by plural users. Execution information associated with this application can be presented to the user through the display 160 controlled by the control unit 150.

(Communication Unit 180)

The communication unit 180 according to the present embodiment has a function of executing communication with other apparatuses via the network 20 described below. The communication unit 180 may receive, from other apparatuses, for example, information obtained by machine learning from data associated with terminal use by the plural users described above.

(Network 20)

The network 20 according to the present embodiment has a function of connecting respective configurations included in an information processing system. The network 20 may include a public network such as the Internet, a telephone network, and a satellite communication network, various types of LANs (Local Area Networks) including Ethernet (registered trademark), WANs (Wide Area Networks), and others. Moreover, the network 20 may include a dedicated network such as IP-VPN (Internet Protocol—Virtual Private Network). Furthermore, the network 20 may include a wireless communication network such as Wi-Fi (registered trademark) and Bluetooth (registered trademark).

The functional configuration example of the information processing terminal 10 according to the present embodiment has been described above. Note that the above functional configuration described with reference to FIG. 2 is presented only by way of example. The functional configuration of the information processing terminal 10 according to the present embodiment is not limited to the example described above. For example, the information processing terminal 10 is not necessarily required to have all of the configurations depicted in FIG. 2. For example, the specifying unit 170 may be incorporated in an apparatus different from the information processing terminal 10. The functional configuration of the information processing terminal 10 according to the present embodiment is allowed to be flexibly modified according to specifications and practical uses.

Moreover, an arithmetic unit, such as a CPU (Central Processing Unit), may read control programs describing processing procedures for implementing the functions of the respective constituent elements from a storage medium, such as a ROM (Read Only Memory) and a RAM (Random Access Memory) storing these control programs, and interpret and execute the programs to perform the respective functions. Accordingly, the configuration to be used may be changed as appropriate according to each technical level for carrying out the present embodiment. Further, an example of a hardware configuration of the information processing terminal 10 will be described later.

2.3. Specific Examples

Examples of screen display performed by the control unit 150 according to the present embodiment will next be described by presenting specific examples.

2.3.1. Display Control Example 1

First described with reference to FIGS. 3A and 3B is an example of screen divisional display control performed by the control unit 150 for controlling display of windows of plural applications, according to the present embodiment. Each of FIGS. 3A and 3B is a diagram for explaining an example of screen divisional display control performed by the control unit 150 for controlling display of windows of plural applications, according to the present embodiment.

The control unit 150 may display windows of plural selected applications while dividing display of the respective windows into at least the first region and the second region of the display screen, on the basis of a following operation performed for information indicating a list of applications. A trigger operation performed for the side face here is a slide operation for sliding the side face downward, for example. In a different example, the trigger operation may be a slide operation for sliding the side face upward, or an operation for sliding the side face in either one of directions and then sliding the side face in the opposite direction in the middle of the former sliding. The divisional display information here may include information indicating a list of applications. Moreover, the divisional display information may be displayed as an overlay image on an image already displayed. Furthermore, the divisional display information may include information indicating a list of applications specified by the specifying unit 170 on the basis of respective references corresponding to the first region and the second region. The applications displayed in the list are applications specified by the specifying unit 170 and presented as applications highly likely to be used by the user U. Accordingly, use convenience of the function of screen divisional display can be improved.

Note that information indicating the list of applications is an icon group IG of applications, for example. The control unit 150 may display a window of a corresponding application on the basis of whether or not the user U has performed a touch operation for any icon I of the icon group IG. Moreover, the list of applications here may be a list of applications other than the above applications unavailable for screen divisional display. By prohibiting display of applications unavailable for screen divisional display as choices, the necessity of reselection of applications is eliminated. Accordingly, more comfortable use of the function of screen divisional display is achievable.

An example depicted in FIGS. 3A and 3B will hereinafter be described. Each of FIGS. 3A and 3B is a diagram for explaining an example of display control performed by the control unit 150 for controlling display of windows of plural applications, according to the present embodiment. FIG. 3A depicts the information processing terminal 10 including the display 160.

In a left part of FIG. 3A, the display 160 displays a home screen on the entire display screen. In a case where the sensor unit 110 detects a slide operation performed by a hand H of the user U for sliding the side face of the display 160, the control unit 150 causes the display 160 to display an application icon group IG1 and application combinations AC constituting divisional display information as depicted in a middle part of FIG. 3A. Three application combinations are presented as the application combinations AC in the middle part of FIG. 3A. As described above, each of the presented combinations is specified by the specifying unit 170 with use of machine learning or the like as a combination of two applications frequently used by the user.

Moreover, the control unit 150 here may display a region box B1 as region information indicating a region where the window of the selected application is to be displayed. The region box B1 is region information indicating which region corresponds to the window where the application currently selected is displayed. As depicted in the middle part of FIG. 3A, the region box B1 has two regions located on the upper side and the lower side, and functions as a GUI that allows the user to select an application displayed in the upper region and an application desired to be displayed in the lower region.

Further, the control unit 150 may cause the display 160 to execute either one of or both display of information pointing to a portion corresponding to the region where the window of the selected application is displayed in the region information and display of the corresponding portion in a predetermined color. For example, a figure such as an arrow may be displayed on a side of the region box B1 to allow the user to easily recognize which region is a region where the application to be currently selected is displayed. Further, in addition to the arrow, the region to be currently selected in the two regions may have a background color different from a background color of the other region. For example, the background color of the region to be currently selected is set to a color brighter than the background color of the other region. In the middle part of FIG. 3A, the display 160 presents an arrow BA1 pointing to a portion corresponding to an upper region UR1 to be currently selected in the region box B1. This portion is indicated in a color brighter than a color of the other portion.

The region information is updated on the basis of a following operation. For example, the region information can be updated in such a manner as to indicate a region where a selected application is displayed at the time of selection of this application. Further, for securing visual recognizability of the divisional display information, the control unit 150 may display information other than the divisional display information in a darker color as depicted in the middle part of FIG. 3A, or may delete the information other than the divisional display information.

A right part of FIG. 3A depicts the application icon group IG1, the application combinations AC, and the region box B1 displayed on the display screen by the display 160. In a case where the sensor unit 110 detects a touch operation performed by the user U for touching, for example, an icon I11 included in the application icon group IG1 in the right part of FIG. 3A, the control unit 150 displays a window of an application corresponding to the icon I11 in the upper region UR1 corresponding to the first region. Note that the control unit 150 may display information other than divisional display information on the display 160 in a color darker than a normal time color when the divisional display information is being displayed on the display 160 as depicted in the right part of FIG. 3A.

A left part of FIG. 3B depicts the window of the application selected by the touch operation for the icon I11 in the right part of FIG. 3A and displayed in the upper region UR1 and also an icon I12 similar to the icon I11 of the application and displayed in an upper part of the region box B1 on the display screen. On the other hand, the home screen is displayed in a lower region LR1. The control unit 150 here causes the display 160 to display an icon group IG2 different from the application icon group IG1. In addition, the information other than the divisional display information is displayed in a dark color. Accordingly, what kinds of applications or the like are displayed in the upper region UR1 and the lower region LR1 is difficult to recognize for the user in this stage. Further, the display 160 presents an arrow BA2 pointing to a portion of the region box B1 to indicate a portion corresponding to the lower region LR1 as a portion to be currently selected. This portion is indicated in a color brighter than a color of the other portion.

The icon group IG2 here may be information indicating a list of applications other than the application selected in the right part of FIG. 3A. In this case, the icon of the application once selected is not displayed in the list, and thus a developer and the user U need not consider a behavior to be performed when the icon once selected is selected again. In a case where the sensor unit 110 detects a touch operation performed by the user U for touching, for example, an icon 121 included in the application icon group IG2 in the left part of FIG. 3B, the control unit 150 displays a window of an application corresponding to the icon 121 in the lower region LR1 corresponding to the second region.

A middle part of FIG. 3B depicts the window of the application selected by the touch operation for the icon 121 on the display screen in the left part of FIG. 3B and displayed in the lower region LR1 of the display screen and also an icon 122 similar to the icon 121 of the application and displayed in a lower part of the region box B1. In the middle part of FIG. 3B, the control unit 150 causes the display 160 to display the windows of the applications corresponding to the icon I11 and the icon 121 in the upper region UR1 and the lower region LR1, respectively, and then causes the display 160 to delete the icon group IG2 and the region box B1 from the display screen. Moreover, the control unit 150 further displays other information in the normal time color to complete control associated with screen divisional display of windows of applications as depicted in a right part of FIG. 3B.

In addition, in a case where the sensor unit 110 detects a touch operation performed by the user U for touching any one of the application combinations AC in the middle part of FIG. 3A, the control unit 150 may cause the display 160 to display windows of plural corresponding applications in the first region and the second region. Moreover, the example depicted in FIGS. 3A and 3B has been the case where selection of the application with use of the region box B1 is achieved by touching the icon of the application. Alternatively, for example, the application may be selected by dragging and dropping the icon of the application into the desired one of the two regions of the region box B1.

As described above, the control unit 150 has a function of displaying divisional display information on the basis of a trigger operation performed for the side face of the display screen and displaying windows of corresponding applications in the first region and the second region on the basis of a following operation for the divisional display information. This function allows the user U to intuitively use the function of screen division display without finding the operation troublesome.

2.3.2. Display Control Example 2

Incidentally, while the application whose window is to be displayed is selected on the basis of the following operation in display control example 1, the application whose window is to be displayed may be selected on the basis of the trigger operation. Specifically, the trigger operation may be an operation for further selecting an icon of an application for which screen divisional display is to be executed. Moreover, the control unit 150 may display windows of plural applications selected on the basis of the trigger operation while dividing display of the respective windows into at least the first region and the second region of the display screen.

Here, for example, the trigger operation performed for an icon I is a long press operation for the icon I. Further, for example, the divisional display information here is information associated with display of an application corresponding to the icon I for which the long press operation has been performed. By displaying windows of plural applications in response to the trigger operation for the icon I as a starting point in the manner described above, a sense of use similar to that in a case of a normal start of applications can be obtained at the time of use of the function of screen divisional display.

An example depicted in FIGS. 4A and 4B will hereinafter be described. Each of FIGS. 4A and 4B is a diagram for explaining an example of display control performed by the control unit 150 for controlling display of windows of plural applications, according to the present embodiment.

FIG. 4A depicts the information processing terminal 10 including the display 160. In a left part of FIG. 4A, the display 160 displays the home screen on the entire display screen. In a case where the sensor unit 110 detects a long press operation performed by the hand H of the user U for an icon 13 of an application, the control unit 150 causes the display 160 to display a popup menu PM constituting divisional display information.

A right part of FIG. 4A depicts the popup menu PM displayed on the basis of a touch operation performed for the icon 13 in the left part of FIG. 4A. In a case where the sensor unit 110 detects a touch operation performed by the user U for touching an icon PMI indicating screen division within the popup menu PM, the control unit 150 causes the display 160 to display a window of an application corresponding to the icon 13 in an upper region UR2 corresponding to the first region.

A left part of FIG. 4B depicts the window of the application displayed in the upper region UR2 on the basis of the touch operation performed for the icon PMI in the right part of FIG. 4A. On the other hand, the home screen is displayed in the lower region LR1 corresponding to the second region. Note that the upper region UR2 is not required to have a size indicated in the left part of FIG. 4B. In addition, information other than the home screen may be displayed in a lower region LR2. At this time, in a case where the sensor unit 110 detects a touch operation performed by the user U for touching an icon 14 displayed on the home screen, the control unit 150 displays a window of an application corresponding to the icon 14 in the lower region LR2.

A right part of FIG. 4B depicts the window of the application that corresponds to the touch operation for the icon PMI in the right part of FIG. 4A and that is displayed in an upper region UR3 and the window of the application that corresponds to the touch operation for the icon 14 in the left part of FIG. 4B and that is displayed in a lower region LR3. Note that the control unit 150 may change the size of the first region from the size of the upper region UR2 to the size of the upper region UR3 at the time of display of the window of the application in the lower region LR3.

As described above, the user U is capable of using the screen divisional function while obtaining a sense similar to a sense obtained in an operation which displays a screen of an application in the entire display screen.

Note that described in each of display control example 1 and displace control example 2 has been the example where the window of the application is not initially displayed on the display screen. However, this function is also applicable to such a case where a window of an application is initially displayed. In such a case, screen divisional display may be achieved by selection of only an application whose window is displayed in the lower region LR by the user U, for example.

2.3.3. Display Control Example 3

Meanwhile, screen divisional display can produce such a situation where the user U uses character input through an application whose window has been displayed in one of the regions. In this situation, a window of the other application not associated with execution of character input may be reduced to a size affecting usability of the window of the other application. In this case, usability of screen divisional display for the user U may be deteriorated.

For example, considered here is a situation of display of a window of a video browsing application in the first region and display of a window of a chat application in the second region. In a case where the user U starts a character input operation for transmitting a message through the chat application, a region for the character input operation is needed in the display screen. In this case, when the size of the window of the video browsing application is reduced to secure the region for the character input operation, it is highly likely to become difficult to have a chat while browsing a video.

Accordingly, at a start of character input through an application whose window has been displayed in any one of regions in the display screen, the control unit 150 may change the size of the region different from the region where the window of the application starting character input has been displayed to a size within a predetermined range. The size within the predetermined range here refers to a size not adversely affecting use of the application whose window is displayed in the region where character input is not performed, for example. For example, in a case where the application corresponding to the region where character input is not performed is a video browsing application, the size within the predetermined range refers to a size sufficient for the user U to watch the entire screen of the video.

Figure 5:
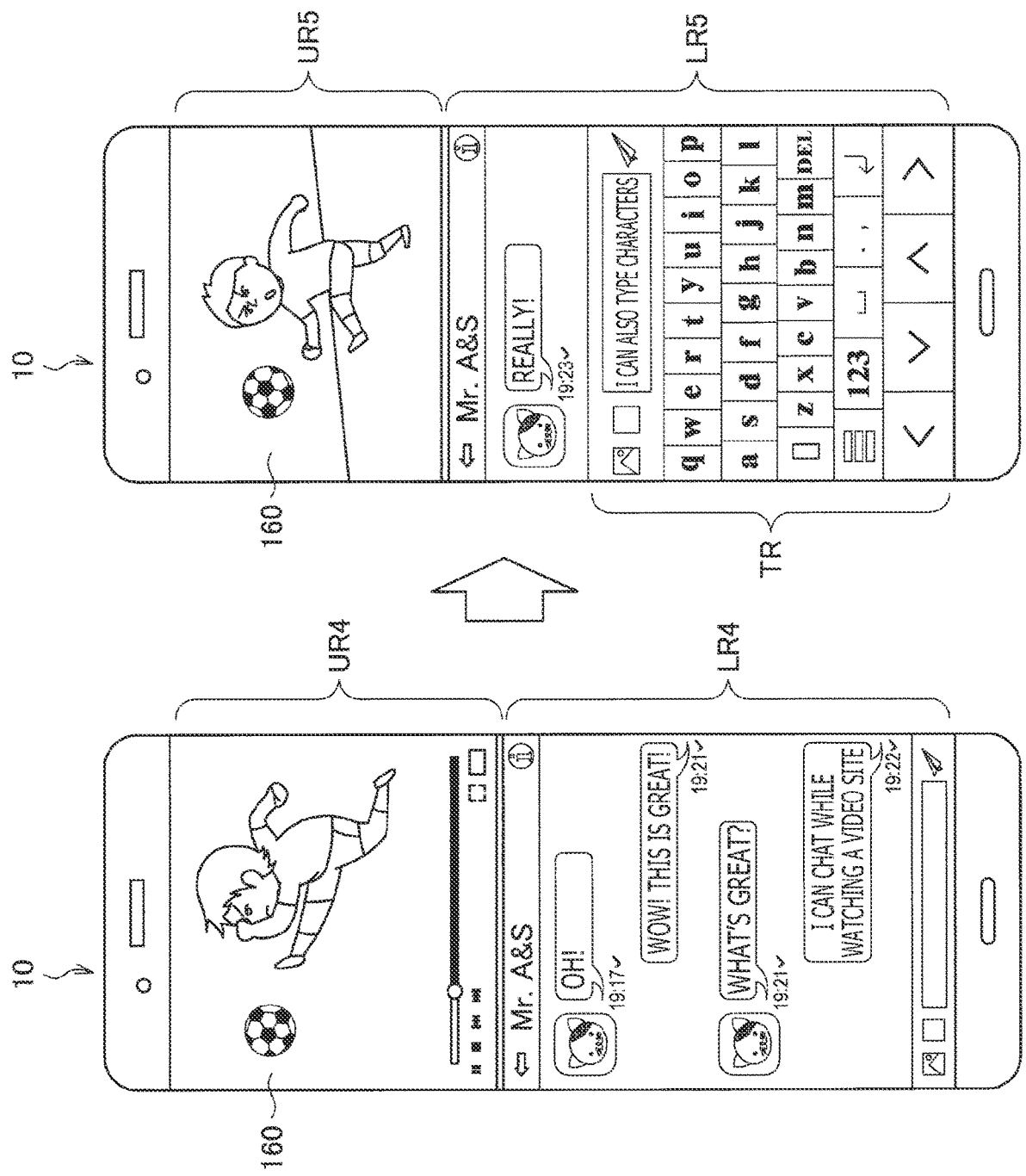
FIG. 5 is a diagram for explaining an example of display control performed by the control unit 150 for controlling display of a window of an application for character input, according to the embodiment.

An example depicted in FIG. 5 will hereinafter be described. FIG. 5 is a diagram for explaining an example of display control performed by the control unit 150 for a window of an application for character input, according to the present embodiment.

A left part of FIG. 5 depicts a window of a video browsing application displayed in an upper region UR4 corresponding to the first region and a window of a chat application displayed in a lower region LR4 corresponding to the second region, both the windows being displayed on the display screen. In a case where the sensor unit 110 detects an operation performed by the user U for starting character input through the chat application in the lower region LR4 in the left part of FIG. 5, the control unit 150 switches the first region where the window of the video browsing application is displayed from the upper region UR4 to an upper region UR5. The upper region UR5 here is a region sized to display an entire screen of the video under browsing.

A right part of FIG. 5 depicts the window of the video browsing application in the upper region UR5 and the window of the chat application including a region TR for character input in a lower region LR5. The upper region UR5 here displays the entire screen of the video under browsing.

As described above, the control unit 150 has a function of determining the size of the first region and the size of the second region in consideration of an application whose window is displayed even in a case of a start of a character input operation during use of screen divisional display. This function is capable of maintaining usability in a case where the user U performs a character input operation.

2.3.4. Display Control Example 4

Described above has been the example where the boundary between the first region and the second region is automatically determined. However, in a case where the sensor unit 110 detects an operation indicating a screen division line corresponding to the boundary between the first region and the second region of the display screen, the control unit 150 may determine the first region and the second region of the display screen while designating this screen division line as the boundary. For example, the operation indicating the screen division line here is an operation for visually cutting the screen, such as a swipe operation from an end of the screen to an opposite end of the screen.

An example depicted in FIG. 6 will hereinafter be described. FIG. 6 is a diagram for explaining an example of determination control performed by the control unit 150 for determining the first region and the second region of the display screen while designating a screen division line as a boundary between the first and second regions, according to the present embodiment.

A left part of FIG. 6 depicts a window of a web browser application displayed on the display screen. In a case where the sensor unit 110 detects a swipe operation performed by the hand H of the user U for cutting the display 160 from a left end to a right end in the left part of FIG. 6, the control unit 150 determines a portion for which this swipe operation has been performed, as the boundary between the first region and the second region.

Further, as depicted in a right part of FIG. 6, the control unit 150 displays the window of the browser application displayed in an upper region UR6 corresponding to the first region on the basis of the determined boundary. On the other hand, the home screen is displayed in a lower region LR6 corresponding to the second region. Note that an operation subsequently performed is similar to the operation method depicted in FIG. 4B, and is thus not repeatedly described.

As described above, the control unit 150 has a function of executing screen divisional display on the basis of an operation indicating a screen divisional line, such as an operation for visually cutting the screen. This function allows the user U to more intuitively use screen divisional display in comparison with an operation for touching a button on the display screen, for example. In addition, while the operation indicating the screen division line in the example of FIG. 6 is a swipe operation for visually cutting the display 160 from the left end to the right end, it is obvious that this operation may be a different operation such as a swipe operation for visually cutting the display 160 from the right end to the left end.

2.3.5. Display Control Example 5

Described above has been the example where screen divisional display is executed on the basis of an operation first performed, which operation is different from an operation for executing normal screen display that displays a window of one application on the entire display screen.

A case where a window of one application is displayed on the display screen will be described here. The control unit 150 may display single display information on the display screen as information associated with screen display of a window of a single application on the display screen, on the basis of a second operation different from a trigger operation corresponding to a first operation, and display the window of the selected single application on the display screen on the basis of a second following operation for the single display information. The second following operation here includes an operation for selecting the application for which single screen display is to be executed. Note that the first operation is a slide operation and that the second operation is a double tap operation, for example.

A specific example of an operation and display control for displaying a window of one application on the entire display screen will be described with reference to FIG. 7A. FIG. 7A is a diagram for explaining an example of display control performed by the control unit 150 for controlling display of a window of one application according to the present embodiment. In a left part of FIG. 7A, the display 160 displays the home screen on the entire display screen. Here, in a case where the sensor unit 110 detects a double tap operation performed by a finger F of the user U for the side face of the display 160 here, the control unit 150 causes the display 160 to display an icon group SI containing icons of plural applications as depicted in a right part of FIG. 7A. The icon group SI here may be displayed on the basis of a reference located at the same height of the display screen as a position of the side face where the double tap operation has been detected. A right part of FIG. 7A depicts the icon group SI such that a highest position of the icon group SI comes to a height corresponding to a detection position TP of the double tap operation.

In a case where the sensor unit 110 detects a touch operation for touching any one of icons contained in the icon group SI in the right part of FIG. 7A, the control unit 150 may display a window of an application corresponding to this icon on the entire display screen.

Comparing the example of FIG. 3A and the example of FIG. 7A, the operation initially performed in the case where a window of one application is displayed on the entire display screen is different from the operation initially performed in the case where windows of plural applications are displayed. However, the operation initially performed at the time of the operation executing normal screen display may be the same operation as the operation initially performed at the time of the operation executing screen divisional display. This standardization of the operation initially performed allows the user U to use screen divisional display without particular consciousness of the use of screen divisional display.

For example, divisional display information may be an overlay image associated with a predetermined application. In this case, the control unit 150 may cause the display 160 to display the overlay image on the basis of a trigger operation performed by the user U, and may cause the display 160 to display a window of a predetermined application in the first region or the second region on the basis of detection of a following operation performed for the overlay image. The overlay image associated with the predetermined application here is an image indicating the predetermined application window which may be displayed in the first region or the second region. The window displayed as the overlay image here may be a window for which a predetermined process has been executed through the predetermined application.

Here, the display position of the overlay image displayed on the display screen by the display 160 may be changed by a drag operation performed by the user U. The control unit 150 may cause the display 160 to display the window of the predetermined application in the first region or the second region on the basis of the drag operation performed by the user U for the overlay image. Specifically, in a case where the user U shifts the overlay image in a predetermined direction of the display screen by the drag operation for the overlay image, the control unit 150 may cause the display 160 to display the window of the application corresponding to the overlay image in the first region or the second region. On the other hand, in a case where the user U shifts the overlay image in another direction of the display screen by the drag operation for the overlay image, the control unit 150 may end the application corresponding to the overlay image.

On the other hand, in a case where the sensor unit 110 detects a touch operation for the overlay image, the control unit 150 may display the window of the application on the entire display screen.

Figure 7D:
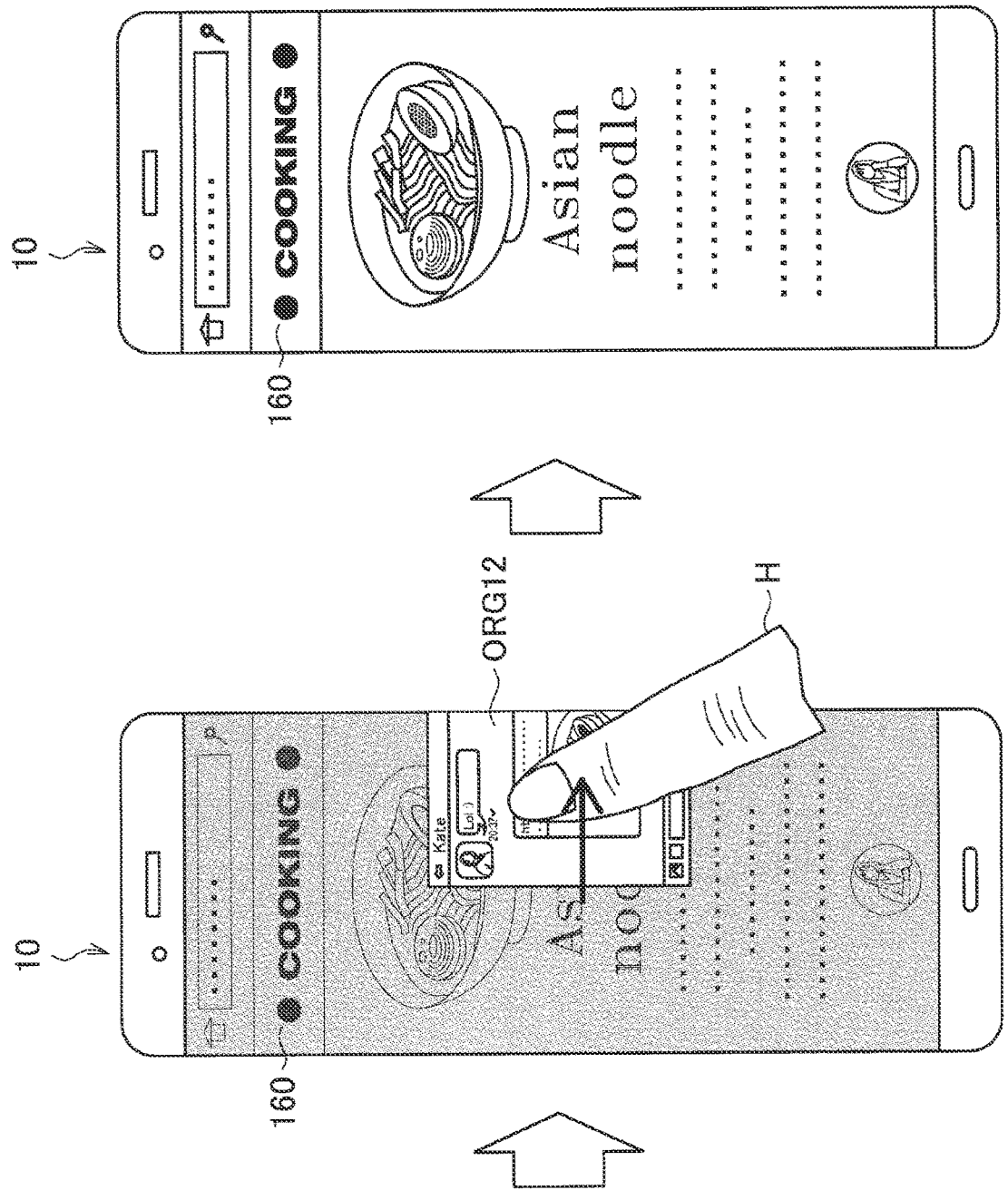
FIG. 7D is a diagram for explaining the example of screen divisional display control performed by the control unit 150 on the basis of an overlay image, according to the embodiment.

Examples depicted in FIGS. 7B, 7C, 7D, and 8 will hereinafter be described. Each of FIGS. 7B, 7C, 7D, and 8 is a diagram for explaining an example of screen divisional display control performed by the control unit 150 on the basis of an overlay image, according to the present embodiment. Each of FIGS. 7B, 7C, and 7D depicts the information processing terminal 10 including the display 160.

A left part of FIG. 7B depicts a window of a web browser application displayed by the display 160. In a case where the sensor unit 110 detects a slide operation performed by the hand H of the user U for sliding the side face of the display 160 here, the control unit 150 causes the display 160 to display a launcher information group MG which is a part of divisional display information. The launcher information group MG here includes plural items of launcher information for displaying windows of applications for each of which a predetermined process has been executed. Note that the control unit 150 may simultaneously display the icon group IG3.

A right part of FIG. 7B depicts the launcher information group MG and the icon group IG3 displayed on the display screen. As depicted in a left part of FIG. 7C, in a case where the sensor unit 110 detects a touch operation performed by the user U for touching the launcher information group MG here, the control unit 150 executes a predetermined process through an application corresponding to a launcher for which the touch operation has been performed, and causes the display 160 to display an overlay image of this application.

A right part of FIG. 7C depicts an overlay image ORG11 of the application displayed on the display screen. According to the example of FIG. 7C, the application corresponding to the overlay image ORG11 is a message application. In a case where the overlay image ORG11 is shifted in a lateral direction by a drag operation performed by the user U here as depicted in a left part of FIG. 7D, the control unit 150 deletes the overlay image ORG11 and ends the application.

After the deletion of the overlay image ORG11 and ending of the application, the control unit 150 displays other information in a normal color to complete the process as depicted in a right part of FIG. 7D. While described with reference to FIG. 7D has been the example where an overlay image ORG12 shifts rightward, a similar process may be performed in a case of a leftward shift.

On the other hand, a left part of FIG. 8 also depicts an overlay image ORG21 of an application displayed on the display screen in a manner similar to the manner depicted in the right part of FIG. 7C. The overlay image ORG21 is similar to the overlay image ORG11 depicted in the right part of FIG. 7C. In a case where the overlay image ORG21 is shifted downward by a drag operation performed by the user U here as depicted in a middle part of FIG. 8, the control unit 150 causes the display 160 to display a window of an application corresponding to an overlay image ORG22 in a lower region LR8 corresponding to the second region as depicted in a right part of FIG. 8. In addition, in a case where the overlay image ORG21 is shifted upward, the control unit 150 may cause the display 160 to display the window of the corresponding application in the first region.

As described above, the control unit 150 has a function of performing screen divisional display on the basis of the overlay image ORG. This function allows the user U to more freely use screen divisional display.

2.3.6. Display Control Example 6

Meanwhile, brightness of the screen displayed in each of the first region and the second region is not taken into consideration in the above description. However, depending on types of applications, it may be desired that brightness of the screen of the region where a window is displayed be different from brightness of the screen of other applications. For example, it is preferable that a video browsing application be displayed with higher brightness than a browser application in some cases. Accordingly, the control unit 150 may display, with brightness determined on the basis of detected luminance, a window of an application corresponding to any one of regions of the display screen, and may display, with brightness within a predetermined range, a window of an application corresponding to a region different from the region where the window is displayed with the brightness determined on the basis of the detected luminance.

Figure 9:
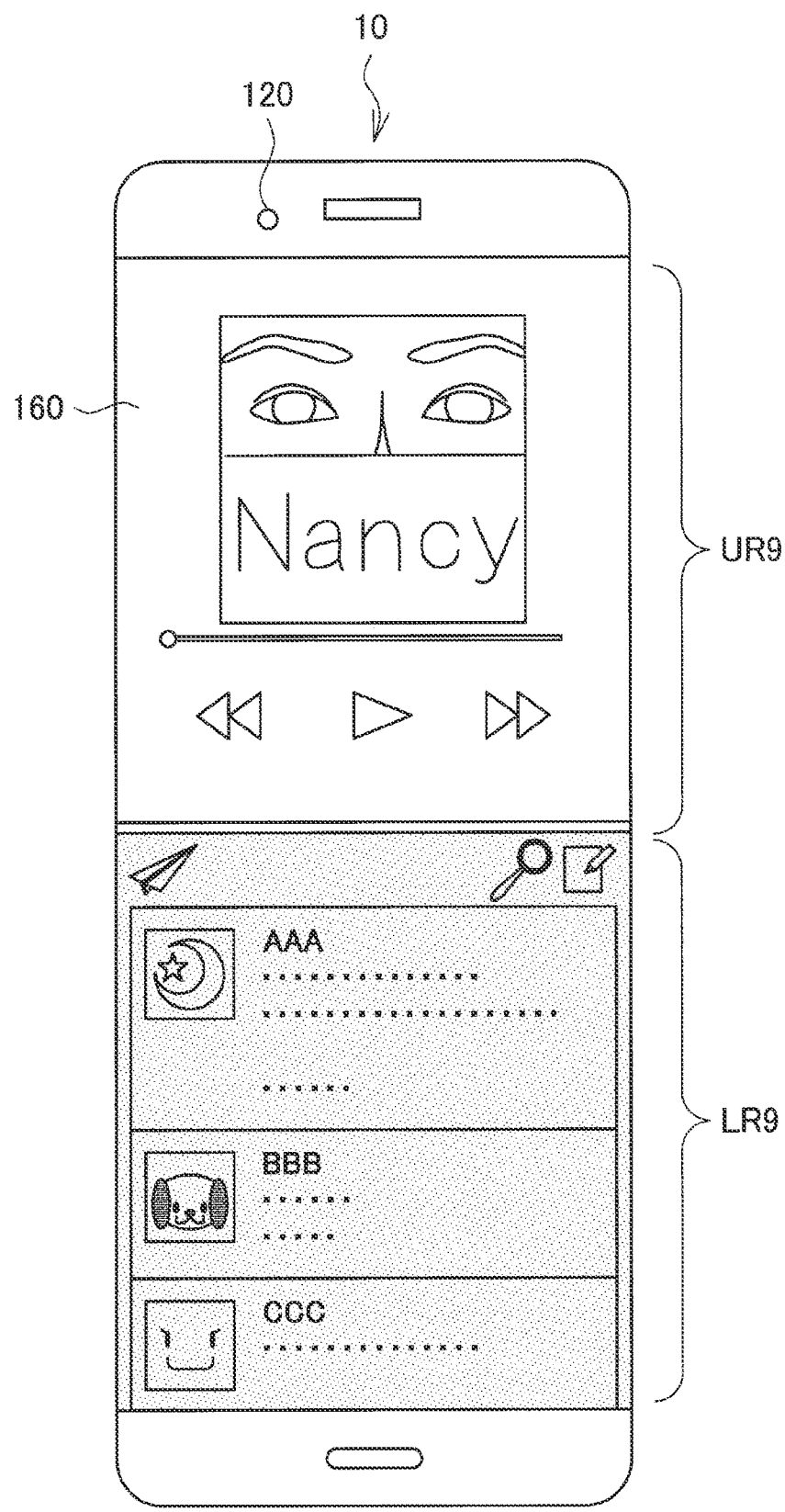
FIG. 9 is a diagram for explaining an example of a brightness adjustment process performed by the control unit 150 for the first region and the second region, according to the embodiment.

An example depicted in FIG. 9 will hereinafter be described. FIG. 9 is a diagram for explaining an example of a brightness adjustment process performed by the control unit 150 for the first region and the second region, according to the present embodiment. In FIG. 9, windows of applications are displayed in an upper region UR9 and a lower region LR9.

The control unit 150 here acquires information associated with an application whose window is displayed in the upper region UR9 corresponding to the first region and an application whose window is displayed in the lower region LR9 corresponding to the second region. Next, the control unit 150 causes the display 160 to display the window in the upper region UR9 of the display screen with brightness determined on the basis of luminance detected by the luminance sensor constituting the input unit 120. Meanwhile, the control unit 150 causes the display 160 to display the window in the lower region LR9 of the display screen with brightness corresponding to the application whose window is displayed in the lower region LR9, which brightness is lower than that of the upper region UR9 in the example of FIG. 9. Note that the brightness may be specified beforehand for each of the applications.

As described above, the control unit 150 has a function of achieving screen display in the first region and the second region with different brightness for each. This function allows use of the respective applications with brightness suited for each.

The specific examples of screen divisional display performed by the control unit 150 according to the present embodiment have been described above. While described above has been screen divisional display based on operations performed for the display 160, the control unit 150 may perform a screen divisional display process based on a result of recognition of voices of the user U obtained by the input unit 120. For example, in a case where an utterance indicating use of screen divisional display by the user U is input from the input unit 120, the control unit 150 may cause the display 160 to display windows of applications in the first region and the second region on the basis of this utterance.

2.4. Operation Examples

A flow of an operation of display control performed by the control unit 150 according to the present embodiment will next be described with reference to FIGS. 10 to 14.

2.4.1. Operation Example 1

Figure 10:
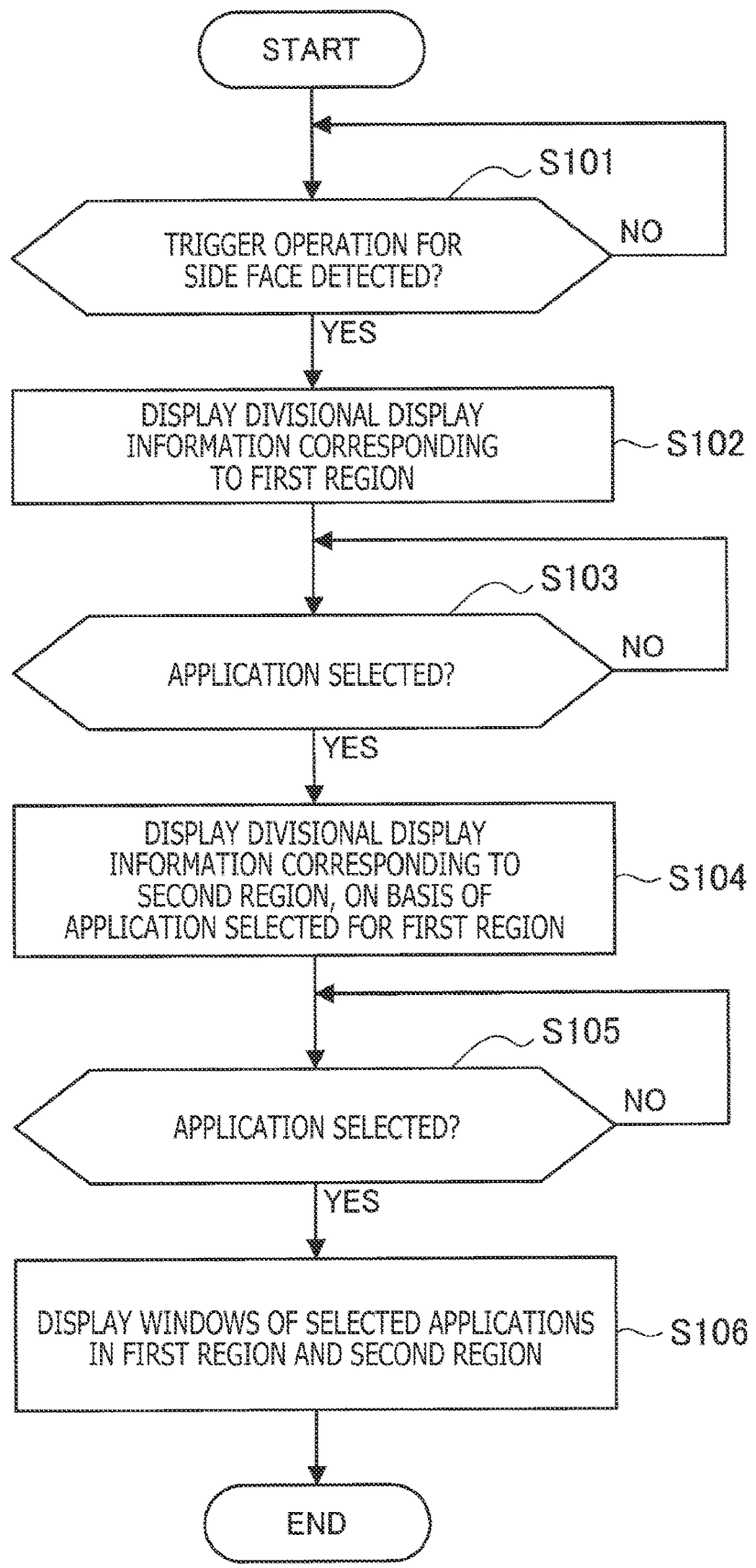
FIG. 10 is a diagram for explaining one example of a flow of an operation of screen divisional display control performed by the control unit 150 on the basis of a trigger operation for a side face, according to the embodiment.

Described first with reference to FIG. 10 is an example of a flow of an operation of screen divisional display control performed by the control unit 150 on the basis of a trigger operation for the side face, according to the present embodiment. FIG. 10 is a diagram for explaining an example of the flow of the operation of screen divisional display control performed by the control unit 150 on the basis of the trigger operation for the side face, according to the present embodiment.

Referring to FIG. 10, first, in a case where the sensor unit 110 does not detect a trigger operation performed for the side face (S101: NO), the flow returns to step S101. On the other hand, in a case where the sensor unit 110 detects a trigger operation for the side face (S101: YES), the control unit 150 causes the display 160 to display divisional display information corresponding to the first region (S102).

Next, in a case where an application is not selected by a following operation performed for the divisional display information displayed in step S102 (S103: NO), the flow returns to step S103. On the other hand, in a case where an application is selected by a following operation performed for the divisional display information displayed in step S102 (S103: YES), the control unit 150 causes the display 160 to display divisional display information corresponding to the second region (S104).

Subsequently, in a case where an application is not selected by a following operation performed for the divisional display information displayed in step S104 (S105: NO), the flow returns to step S105. On the other hand, in a case where an application is selected by a following operation performed for the divisional display information displayed in step S104 (S105: YES), the control unit 150 causes the display 160 to display a window of the application selected in step S103 in the first region and display a window of the application selected in step S105 in the second region (S106), and the control unit 150 ends the operation.

2.4.2. Operation Example 2

Figure 11:
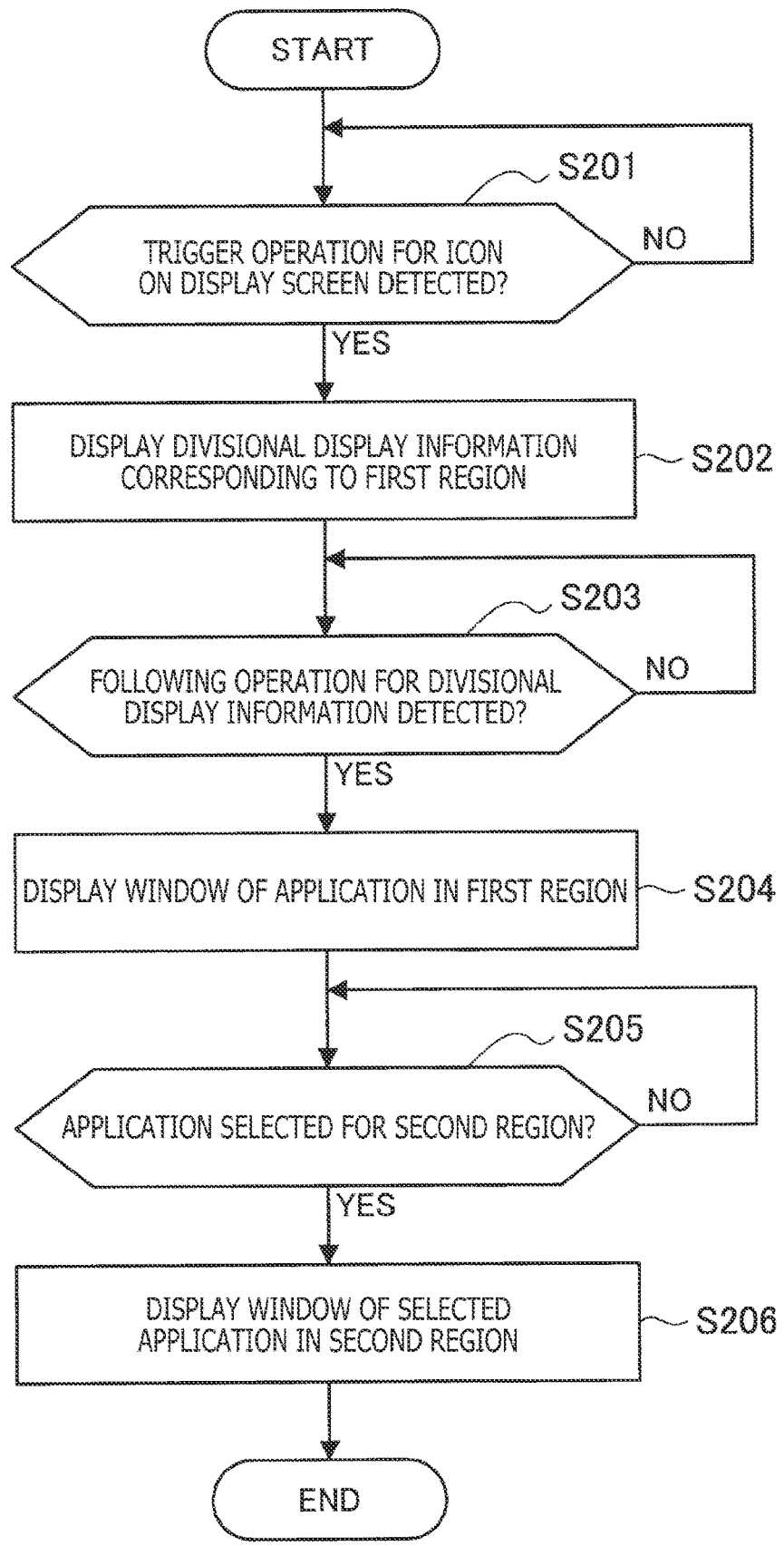
FIG. 11 is a diagram for explaining an example of a flow of an operation of screen divisional display control performed by the control unit 150 on the basis of a trigger operation for an icon on the display screen, according to the embodiment.

Described next with reference to FIG. 11 is an example of a flow of an operation of screen divisional display control based on a trigger operation and performed by the control unit 150 for an icon on the display screen, according to the present embodiment. FIG. 11 is a diagram for explaining an example of the flow of the operation of screen divisional display control based on the trigger operation and performed by the control unit 150 for the icon on the display screen, according to the present embodiment.

Referring to FIG. 11, first, in a case where the sensor unit 110 does not detect a trigger operation for an icon I on the display screen (S201: NO), the flow returns to step S201. On the other hand, in a case where the sensor unit 110 detects a trigger operation for the icon I on the display screen (S201: YES), the control unit 150 causes the display 160 to display divisional display information corresponding to the first region (S202).

Next, in a case where a following operation for the divisional display information displayed in step S202 is not detected (S203: NO), the flow returns to step S203. On the other hand, in a case where a following operation for the divisional display information displayed in step S202 is detected (S203: YES), the control unit 150 causes the display 160 to display, in the first region, a window of an application corresponding to the icon I for which the trigger operation has been performed in step S201 (S204).

Subsequently, in a case where an application is not selected by a following operation performed for the second region (S205: NO), the flow returns to step S205. On the other hand, in a case where an application is selected by a following operation for the second region (S205: YES), the control unit 150 causes the display 160 to display a window of the application selected in step S205 in the second region (S206), and ends the operation.

2.4.3. Operation Example 3

Figure 12:
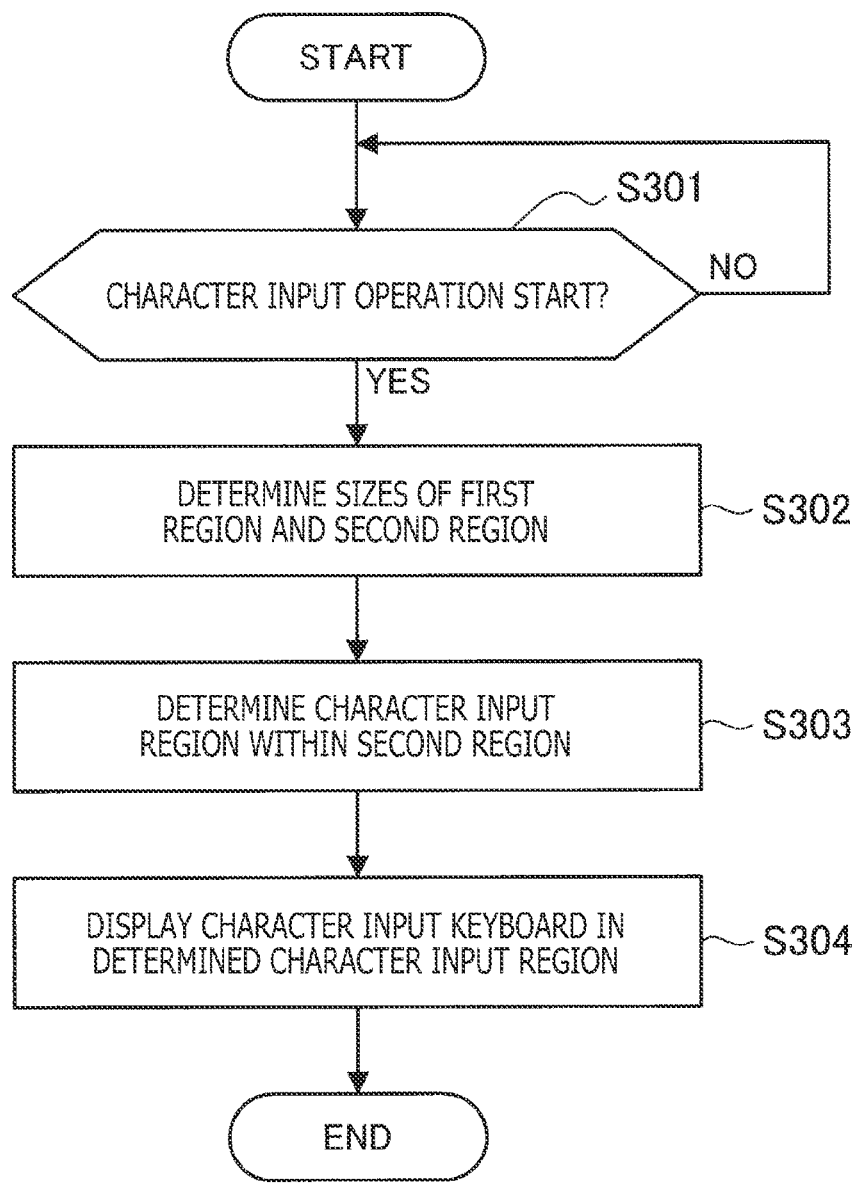
FIG. 12 is a diagram for explaining an example of a flow of an operation of display control performed by the control unit 150 for controlling display of a window of an application for character input, according to the embodiment.

Described next with reference to FIG. 12 is an example of a flow of an operation of display control performed by the control unit 150 for a window of an application for character input. FIG. 12 is a diagram for explaining an example of the flow of the operation of display control performed by the control unit 150 for the window of the application for character input, according to the present embodiment.

Referring to FIG. 12, first, in a case where the input unit 120 does not start character input through an application whose window has been displayed in the second region (S301: NO), the flow returns to step S301. On the other hand, in a case where the input unit 120 starts character input through the application whose window has been displayed in the second region (S301: YES), the control unit 150 determines the size of the first region within a predetermine range and the size of the second region in correspondence with this predetermined range (S302).

Subsequently, the control unit 150 determines a character input region within the second region determined in step S302 (S303). Thereinafter, the control unit causes the display 160 to display a character input keyboard in the character input region determined in step S303 (S304), and the control unit 150 ends the operation.

2.4.4. Operation Example 4

Figure 13:
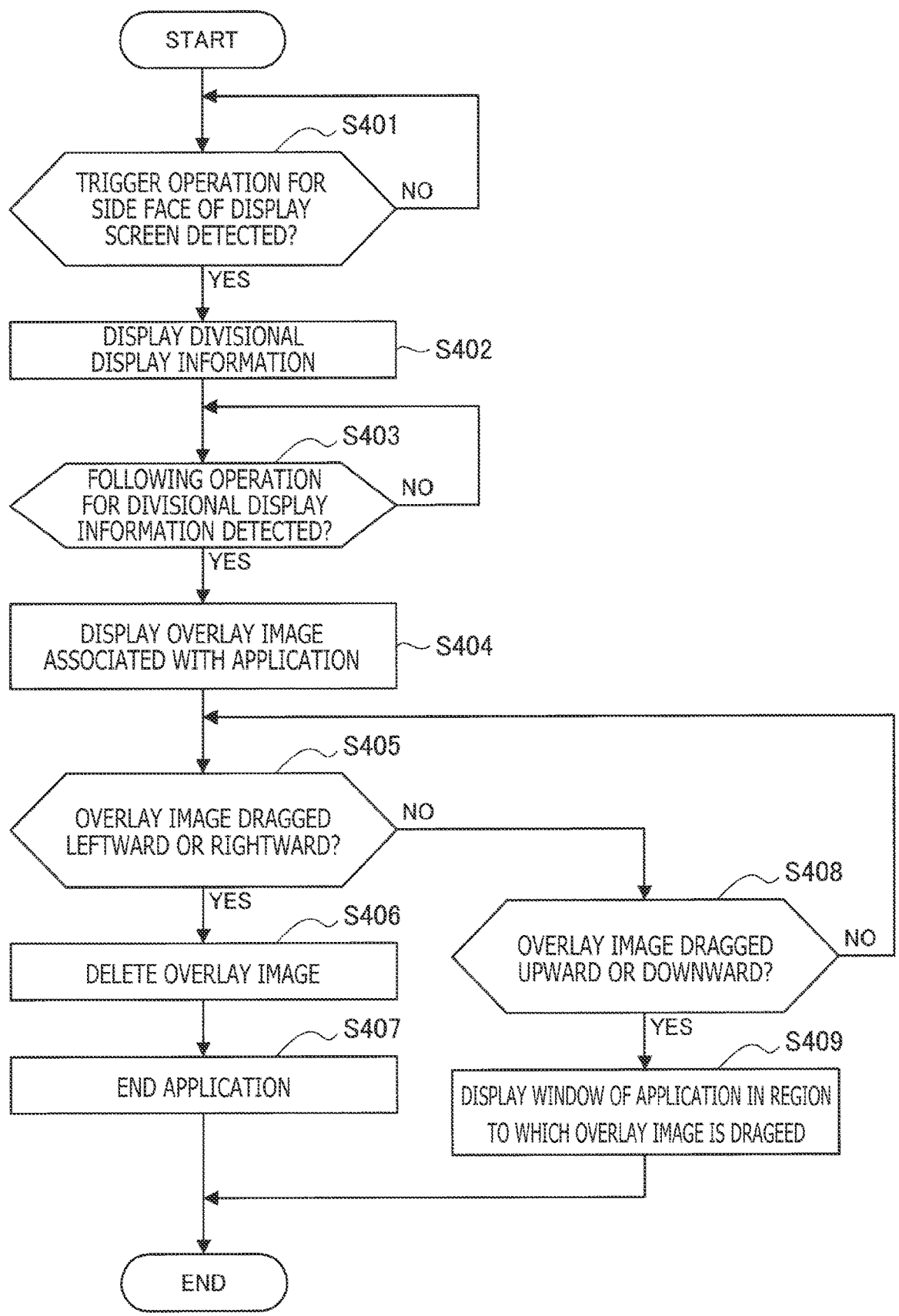
FIG. 13 is a diagram for explaining an example of a flow of an operation of a screen divisional display process performed by the control unit 150 on the basis of an overlay image, according to the embodiment.

Described next with reference to FIG. 13 is an example of a flow of an operation of a screen divisional display process performed by the control unit 150 on the basis of an overlay image, according to the present embodiment. FIG. 13 is a diagram for explaining an example of the flow of the operation of the screen divisional display process performed by the control unit 150 on the basis of the overlay image, according to the present embodiment.

Referring to FIG. 13, first, in a case where the sensor unit 110 does not detect a trigger operation performed for the side face (S401: NO), the flow returns to step S401. On the other hand, in a case where the sensor unit 110 detects a trigger operation for the side face (S401: YES), the control unit 150 causes the display 160 to display launcher information corresponding to the first region (S402).

Next, in a case where an application is not selected by a following operation performed for the divisional display information displayed in step S402 (S403: NO), the flow returns to step S403. On the other hand, in a case where an application is selected by a following operation performed for the divisional display information displayed in step S402 (S403: YES), the control unit 150 causes the display 160 to display an overlay image associated with the application selected in step S403 (S404).

Subsequently, in a case where the overlay image displayed in step S404 is dragged leftward or rightward (S405: YES), the control unit 150 deletes this overlay image (S406). Thereinafter, the control unit 150 ends the application whose overlay image has been deleted in step S406 (S407), and ends the operation.

On the other hand, in a case where the overlay image displayed in step S404 is not dragged leftward or rightward (S405: NO), nor is it dragged upward or downward (S408: NO), the flow returns to step S405. On the other hand, in a case where the overlay image is dragged upward or downward (S408: YES), the control unit 150 causes the display 160 to display a window of the application selected in step S403 in a region to which the overlay image has been dragged (S409), and ends the operation.

2.4.5. Operation Example 5

Described next with reference to FIG. 14 is an example of a flow of an operation associated with brightness adjustment performed by the control unit 150 for the first region and the second region, according to the present embodiment. FIG. 14 is a diagram for explaining an example of the flow of the operation associated with brightness adjustment performed by the control unit 150 for the first region and the second region, according to the present embodiment.

Referring to FIG. 14, the control unit 150 first acquires information associated with respective applications whose windows are displayed in the first region and the second region (S501). Next, the control unit 150 determines an application for which brightness adjustment of the window screen based on a detection result obtained by the luminance sensor is to be executed, on the basis of information associated with the application and obtained in step S501 (S502).

Thereinafter, the control unit 150 adjusts brightness of a window screen of the application determined in step S502, on the basis of a detection result obtained by the luminance sensor, and causes the display 160 to display the window screen with the adjusted brightness (S503). Then, the control unit 150 displays brightness of a window screen of an application which is the other application not determined in step S502 with brightness within a predetermined range (S504), and ends the operation.

2.5. Modification

A modification according to the present embodiment will next be described. The screen divisional display example performed by the control unit 150 as described above is also applicable to what is generally called a flexible display. A control unit 350 included in an information processing terminal 30 including a flexible display is similar to the control unit 150, and may divide regions of a display screen with a boundary located at a folded portion of the display, and display windows of applications in the divided regions. Moreover, the control unit 350 may further display windows of applications in a first region and a second region in the regions divided at the folded portion, on the basis of a trigger operation and a following operation. Note that the folding of the flexible display is detectable according to a rotation state of a hinge provided at the folded portion, for example.

The modification according to the present embodiment will be described here with reference to FIGS. 15A and 15B. FIGS. 15A and 15B are diagrams for explaining the modification according to the present embodiment. FIG. 15A depicts the information processing terminal 30 including a display 360 which is flexible (foldable). In FIG. 15A, the control unit 150 displays a window of a browser application on the display 360.

In a case where the input unit 120 detects that the display 360 is folded and then opened as depicted in an upper right part of FIG. 15A here, the control unit 150 may display a window of a browser application in a left region AR1 with a boundary located at the folded portion. Note that the home screen is displayed in a right region AR2 different from the left region AR1.

Next, in a case where a sensor unit 310 detects that a slide operation for sliding the right-side face of the display 360 has been performed by the hand H of the user U in an upper left part of FIG. 15B, an application icon group IG4 and a region box B2 constituting divisional display information are displayed in the right region AR2 of the display 360 as depicted in FIG. 15B. When two icons I of applications are selected by the user U in an upper right of FIG. 15B, the control unit 150 causes the display 360 to display windows of the respective applications in an upper region UR10 corresponding to the first region and a lower region LR10 corresponding to the second region.

Note that selection of the applications in the right region AR2 in FIG. 15B is similar to the process depicted in the right part of FIG. 3A and the left part of FIG. 3B. Needless to say, the applications may be selected by other methods. Moreover, the control unit 350 further displays other information in a normal time color to complete the process associated with screen divisional display of the windows of the applications in the right region AR2 as depicted in a lower part of FIG. 15B. Note that divisional display information is displayed in the right region AR2 of the display 360 for urging the user to select the applications displayed in the upper region UR10 and the lower region LR10 of the right region AR2 of the display 360, according to the slide operation performed for the right-side face of the display 360 as a trigger in FIG. 15B. Similarly, in a case where a slide operation for the left side face of the display 360 is detected, divisional display information for urging the user to select applications displayed in the upper region and the lower region of the left region AR1 of the display 360 may be displayed in the left region AR1 of the display 360. Further, adoptable is such a configuration where the region box B2 of divisional display information has four regions as a GUI for urging the user to select applications for display in the upper region and the lower region of each of the left region AR1 and the right region AR2, i.e., four regions, of the display 360.

In such a manner, the user U is allowed to use applications in a more flexible manner by similarly achieving further screen divisional display in a part of the display screen of the flexible display.

3. Hardware Configuration Example

Figure 16:
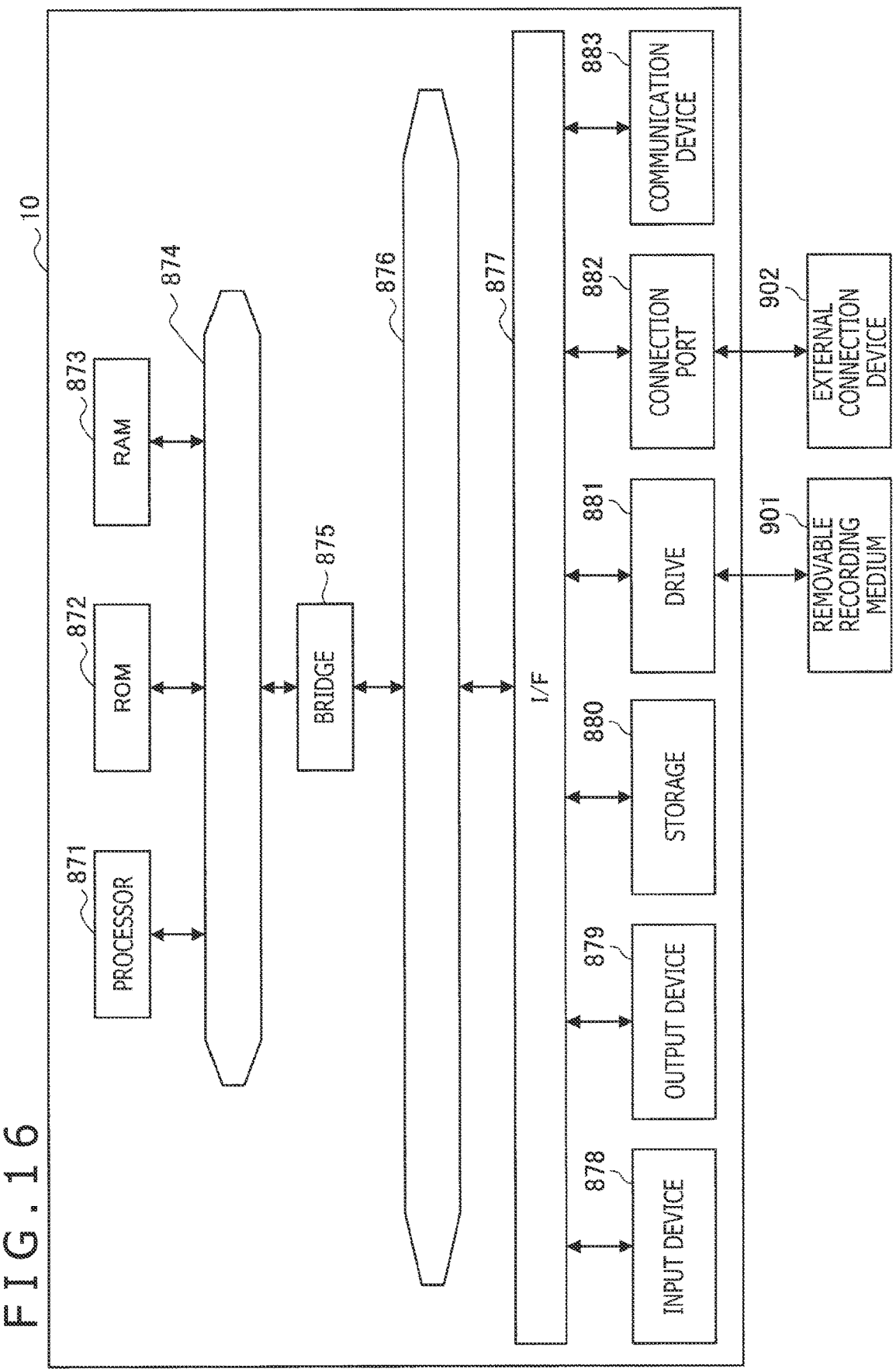
FIG. 16 is a block diagram depicting a hardware configuration example of the information processing terminal 10 according to an embodiment of the present disclosure.

A hardware configuration example of the information processing terminal 10 according to an embodiment of the present disclosure will next be described. FIG. 16 is a block diagram depicting a hardware configuration example of the information processing terminal 10 according to an embodiment of the present disclosure. Referring to FIG. 16, for example, the information processing terminal 10 includes a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration depicted here is presented only by way of example. Some of the constituent elements of the hardware may be omitted. Moreover, constituent elements other than the constituent elements presented here may be further incorporated.

(Processor 871)

For example, the processor 871 functions as an arithmetic processing unit or a controller, and controls the overall or a part of operations of the respective constituent elements under various types of programs recorded in the ROM 872, the RAM 873, the storage 880, or a removable recording medium 901.

(ROM 872, RAM 873)

The ROM 872 is means for storing programs to be read into the processor 871, data used for calculation, and the like. For example, the RAM 873 temporarily or permanently stores programs to be read into the processor 871, various types of parameters changeable as appropriate at the time of execution of these programs, and the like.

(Host Bus 874, Bridge 875, External Bus 876, Interface 877)

For example, the processor 871, the ROM 872, and the RAM 873 are connected to one another via the host bus 874 capable of achieving high-speed data transfer. On the other hand, for example, the host bus 874 is connected to the external bus 876 achieving data transfer at a relatively low speed, via the bridge 875. In addition, the external bus 876 is connected to various types of constituent elements via the interface 877.

(Input Device 878)

For example, the input device 878 includes a mouse, a keyboard, a touch panel, a button, a switch, a lever, or the like. Moreover, the input device 878 may include a remote controller (hereinafter referred to as a remote controller) capable of transmitting control signals with use of infrared light or other radio waves. Furthermore, the input device 878 includes an audio input device such as a microphone.

(Output Device 879)

For example, the output device 879 is a device capable of visually or auditorially notifying a user of acquired information, such as a display device like a CRT (Cathode Ray Tube), an LCD, and an organic EL, an audio output device such as a speaker and a headphone, a printer, a cellular phone, and a facsimile machine. Moreover, the output device 879 according to the present disclosure includes various types of oscillation devices capable of outputting haptic sense stimulations.

(Storage 880)

The storage 880 is a device for storing various types of data. For example, the storage 880 includes a magnetic storage device such as a hard disk drive (HDD), a semiconductor storage device, an optical storage device, a magneto-optical storage device, or the like.

(Drive 881)

For example, the drive 881 is a device which reads information recorded in the removable recording medium 901 such as a magnetic disk, an optical disk, a magneto-optical disk, and a semiconductor memory, or writes information to the removable recording medium 901.

(Removable Recording Medium 901)

For example, the removable recording medium 901 is a DVD medium, a Blu-ray (registered trademark) medium, an HD DVD medium, various types of semiconductor storage media, or the like. Needless to say, for example, the removable recording medium 901 may be an IC card on which a contactless IC chip is mounted, an electronic apparatus, or the like.

(Connection Port 882)

For example, the connection port 882 is a port for connecting an external connection device 902, such as a USB (Universal Serial Bus) port, an IEEE1394 port, an SCSI (Small Computer System Interface), an RS-232C port, and an optical audio terminal.

(External Connection Device 902)

For example, the external connection device 902 is a printer, a portable music player, a digital camera, a digital video camera, an IC recorder, or the like.

(Communication device 883)

The communication device 883 is a communication device for connecting to a network, such as a communication card for a wired or wireless LAN, Bluetooth (registered trademark), or WUSB (Wireless USB), a router for optical communication, a router for ADSL (Asymmetric Digital Subscriber Line), and a modem for various types of communication.

4. Summary

As described above, the information processing terminal 10 according to an embodiment of the present disclosure is capable of improving usability of use of screen divisional display for windows of plural applications by performing display control which allows intuitive execution of operations associated with screen divisional display of windows of plural applications.

While the preferred embodiment of the present disclosure has been described above in detail with reference to the accompanying drawings, the technical scope of the present disclosure is not limited to such an example. It is obvious that various examples of modifications and corrections within the scope of the technical spirit described in the claims can be conceived of by those having ordinary knowledges in the technical field of the present disclosure. It is understood as a matter of course that these modifications and corrections belong to the technical scope of the present disclosure.

Moreover, advantageous effects described in the present description are presented only for an explanatory or exemplary purpose, and thus are not presented for a limiting purpose. Accordingly, the technology according to the present disclosure can offer other advantageous effects apparent for those skilled in the art in light of the description of the present description, in addition to or in place of the advantageous effects described above.

Note that the following configurations also belong to the technical scope of the present disclosure.

(1)

An information processing apparatus including:

a control unit that displays divisional display information on a display screen as information associated with screen divisional display of windows of plural applications on the display screen, on the basis of a trigger operation, and displays the windows of the plural applications selected, on the basis of a following operation for the divisional display information displayed, while dividing display of the windows into at least a first region and a second region of the display screen, in which the following operation includes an operation that selects the applications for which the screen divisional display is to be executed.

(2)

The information processing apparatus according to (1) described above, in which the divisional display information includes information indicating a list of the applications, and the control unit displays the windows of the plural applications selected while dividing display of the windows into at least the first region and the second region of the display screen, on the basis of the following operation for the information indicating the list of the applications.

(3)

The information processing apparatus according to (2) described above, in which, in a case where the applications are selected on the basis of the following operation, the control unit displays information indicating a list of applications other than the selected applications on the display screen on the basis of the following operation.

(4)

The information processing apparatus according to (2) or (3) described above, in which the list of the applications includes a list of applications other than applications unavailable for the screen divisional display, and the control unit displays information indicating the list of the applications other than the applications unavailable for the screen divisional display, on the display screen, on the basis of the trigger operation.

(5)

The information processing apparatus according to any one of (2) to (4) described above, in which the divisional display information includes region information indicating regions where the windows of the applications selected are displayed, and the control unit updates the region information displayed, on the basis of the following operation.

(6)

The information processing apparatus according to (5) described above, in which the control unit executes either one of or both display of information that points to portions corresponding to the regions indicated by the region information as the regions where the windows of the selected applications are displayed and display of the portions in a predetermined color.

(7)

The information processing apparatus according to any one of (2) to (6) described above, in which the divisional display information includes information indicating a list of applications specified on the basis of references corresponding to the first region and the second region, and the control unit displays the windows of the plural selected applications while dividing display of the windows into at least the first region and the second region of the display screen, on the basis of the following operation for the information indicating the list of the applications specified on the basis of the references.

(8)

The information processing apparatus according to (1) described above, in which the trigger operation includes an operation that further selects the applications for which the screen divisional display is to be executed, and the control unit displays the windows of the plural applications selected on the basis of the trigger operation and the following operation while dividing display of the windows into at least the first region and the second region of the display screen.

(9)

The information processing apparatus according to any one of (1) to (8) described above, in which the divisional display information further includes information indicating a combination of the plural applications, and the control unit displays the windows of the plural applications corresponding to the combination while dividing display of the windows into at least the first region and the second region of the display screen, on the basis of the following operation for the information indicating the combination.

(10)

The information processing apparatus according to any one of (1) to (9) described above, in which the control unit displays an overlay image associated with the corresponding application, on the basis of detection of the following operation, and displays the window of the corresponding application in the first region or the second region on the basis of detection of a further operation for the overlay image displayed.

(11)

The information processing apparatus according to (10) described above, in which the further operation for the overlay image includes a drag operation for the overlay image, and the control unit displays the window of the application in either the first region or the second region on the basis of the drag operation for the overlay image.

(12)

The information processing apparatus according to (11) described above, in which, in a case where the overlay image is shifted in a predetermined direction of the display screen on the basis of the drag operation for the overlay image, the control unit displays the window of the application in either the first region or the second region.

(13)

The information processing apparatus according to any one of (11) and (12) described above, in which the overlay image associated with the application includes an overlay image indicating a result of execution of a predetermined process through the application, and the control unit displays the overlay image indicating the result of execution of the predetermined process through the application, on the basis of detection of the trigger operation.

(14)

The information processing apparatus according to any one of (1) to (13) described above, in which, at a start of character input through the application whose window has been displayed in any one of the regions in the display screen, the control unit changes a size of a region different from the region where the window of the application starting the character input has been displayed to a size within a predetermined range.

(15)

The information processing apparatus according to any one of (1) to (14) described above, in which the control unit displays, with brightness determined on the basis of detected luminance, the window of the application corresponding to any one of the regions of the display screen, and displays, with brightness within a predetermined range, the window of the application corresponding to a region different from the region where the window is displayed with the brightness determined on the basis of the detected luminance.

(16)

The information processing apparatus according to any one of (1) to (15) described above, in which, in a case of detection of an operation that indicates a screen division line corresponding to a boundary between the first region and the second region of the display screen, the control unit determines the first region and the second region of the display screen while designating the screen division line as the boundary.

(17)

The information processing apparatus according to any one of (1) to (16) described above, in which the control unit starts the application included in the plural selected applications and not originally started, on the basis of the following operation, and displays the windows of the plural selected applications while dividing display of the windows into at least the first region and the second region of the display screen.

(18)

The information processing apparatus according to any one of (1) to (17) described above, in which the control unit displays single display information on the display screen as information associated with screen display of a window of a single application on the display screen, on the basis of a second operation different from the trigger operation corresponding to a first operation, and displays the window of the selected single application on the display screen on the basis of a second following operation for the single display information displayed, and the second following operation includes an operation for selecting the application for which single screen display is to be executed.

(19)

The information processing apparatus according to any one of (1) to (18) described above, in which the control unit displays the divisional display information on the display screen in a case where the trigger operation for a side face of the display screen is detected.

(20)

The information processing apparatus according to (8) described above, in which the trigger operation includes an operation that further selects an icon of the application for which the screen divisional display is to be executed, and the control unit starts the application that corresponds to the icon selected on the basis of the trigger operation and that is not started or the application selected on the basis of the following operation and not started, and displays the windows of the plural selected applications while dividing display of the windows into at least the first region and the second region of the display screen.

(21)

The information processing apparatus according to any one of (1) to (20) described above, in which the control unit displays, on the basis of the trigger operation and the following operation performed in the region for which the screen divisional display has been executed on the display screen, the windows of the plural applications selected while further dividing display of the windows into at least the first region and the second region in the region for which the screen divisional display has been executed on the display screen.

(22)

An information processing method including:

displaying, by a processor, divisional display information on a display screen as information associated with screen divisional display of windows of plural applications on the display screen, on the basis of a trigger operation, and displaying the windows of the plural applications selected, on the basis of a following operation for the divisional display information displayed, while dividing display of the windows into at least a first region and a second region of the display screen, in which the following operation includes an operation that selects the applications for which the screen divisional display is to be executed.

REFERENCE SIGNS LIST

10: Information processing terminal
110: Sensor unit
120: Input unit
130: Storage unit
150: Control unit
160: Display
170: Specifying unit
180: Communication unit
20: Network

The invention claimed is:

1. An information processing apparatus, comprising:
a processor configured to:
control a display screen to display divisional display information based on a trigger operation,
wherein the divisional display information is associated with screen divisional display of windows of a plurality of applications on the display screen, the divisional display information is displayed as an overlay with a translucent background over other information displayed on the display screen, the overlay of the divisional display information causes the other information on the display screen to be visually depicted in a darker color;
control the display screen to display the windows of the plurality of applications by division of the display screen into a first region and a second region,
wherein the division of the display screen and a selection of the plurality of applications are based on a following operation on the displayed divisional display information,
the displayed divisional display information includes a region box different from the displayed windows of the selected plurality of applications,
the region box indicates regions where the windows of the selected plurality of applications are displayed, and
the following operation includes an operation that selects the plurality of applications for which the screen divisional display is to be executed; and
update the region box based on the following operation to depict where the windows of the selected plurality of applications are displayed.

2. The information processing apparatus according to claim 1, wherein
the divisional display information includes information indicating a list of applications, and
the selection of the plurality of applications is based on the following operation on the information indicating the list of applications.

3. The information processing apparatus according to claim 2, wherein
in a case where the plurality of applications is selected based on the following operation, the processor is further configured to control the display screen to display the information indicating the list of applications excluding the selected plurality of applications on the display screen based on the following operation.

4. The information processing apparatus according to claim 2, wherein
the list of applications excludes applications unavailable for the screen divisional display, and
the processor is further configured to control the display screen to display the information indicating the list of applications excluding the applications unavailable for the screen divisional display, on the display screen, based on the trigger operation.

5. The information processing apparatus according to claim 2, wherein the processor is further configured to execute at least one of:
display of information that points to portions, corresponding to the regions indicated by the region box, as the regions where the windows of the selected plurality of applications are displayed, or
display of the portions in a determined color.

6. The information processing apparatus according to claim 2, wherein
the divisional display information includes the information indicating the list of applications specified based on references corresponding to the first region and the second region, and
the selection of the plurality of applications is based on the following operation for the information indicating the specified list of the applications.

7. The information processing apparatus according to claim 1, wherein
the trigger operation further selects the plurality of applications for which the screen divisional display is to be executed, and
the processor is further configured to control the display screen to display the windows of the plurality of applications based on both the trigger operation and the following operation.

8. The information processing apparatus according to claim 1, wherein
the divisional display information further includes information indicating a combination of the plurality of applications, and
the processor is further configured to control the display screen to display the windows of the plurality of applications corresponding to the combination based on the following operation for the information indicating the combination.

9. The information processing apparatus according to claim 1, wherein the processor is further configured to:
control the display screen to display an overlay image associated with a corresponding application of the plurality of applications, based on detection of the following operation; and
control the display screen to display a window of the corresponding application in one of the first region or the second region based on detection of a further operation for the displayed overlay image.

10. The information processing apparatus according to claim 9, wherein
the further operation for the overlay image includes a drag operation for the overlay image, and
the processor is further configured to display the window of the corresponding application in one of the first region or the second region based on the drag operation for the overlay image.

11. The information processing apparatus according to claim 10, wherein
in a case where the overlay image is shifted in a determined direction of the display screen based on the drag operation for the overlay image, the processor is further configured to control the display screen to display the window of the corresponding application in one of the first region or the second region.

12. The information processing apparatus according to claim 9, wherein
the overlay image associated with the corresponding application indicates a result of execution of a determined process through the corresponding application, and
the processor is further configured to control, based on a detection of the trigger operation, the display screen to display the overlay image indicating the result of execution of the determined process through the corresponding application.

13. The information processing apparatus according to claim 1, wherein
at a start of character input through an application whose window has been displayed in one of a plurality of regions in the display screen, the processor is further configured to change a size of a region different from the region where the window of the application starting the character input has been displayed to a size within a determined range.

14. The information processing apparatus according to claim 1, wherein the processor is further configured to:
display, with brightness determined based on detected luminance, a window of a first application corresponding to one of a plurality of regions of the display screen, wherein the plurality of regions includes the first region and the second region; and display, with brightness within a determined range, the window of a second application corresponding to a region different from the region where the window is displayed with the determined brightness.

15. The information processing apparatus according to claim 1, wherein, in a case of detection of an operation that indicates a screen division line corresponding to a boundary between the first region and the second region of the display screen, the processor is further configured to determine the first region and the second region of the display screen while designating the screen division line as the boundary.

16. The information processing apparatus according to claim 1, wherein the processor is further configured to:
    start, based on the following operation, an application included in the plurality of applications and not originally started; and
    display the windows of the plurality of applications in at least the first region and the second region.

17. The information processing apparatus according to claim 1, wherein
    the processor is further configured to:
        control the display screen to display single display information associated with screen display of a window of a single application on the display screen, wherein the display of the single display information is based on a second operation different from the trigger operation corresponding to a first operation; and
        control the display screen to display the window of the single application based on a second following operation for the single display information, and
    the second following operation is for selection of the single application for which single screen display is to be executed.

18. The information processing apparatus according to claim 1, wherein
    the processor is further configured to control the display screen to display, based on the trigger operation and the following operation performed in a region for which the screen divisional display has been executed on the display screen, the windows of the plurality of applications in the region for which the screen divisional display has been executed on the display screen.

19. An information processing method, comprising:
    controlling, by a processor, a display screen to display divisional display information based on a trigger operation,
    wherein the divisional display information is associated with screen divisional display of windows of a plurality of applications on the display screen, the divisional display information is displayed as an overlay with a translucent background over other information displayed on the display screen, the overlay of the divisional display information causes the other information on the display screen to be visually depicted in a darker color;
    controlling, by the processor, the display screen to display the windows of the plurality of applications by division of the display screen into a first region and a second region,
    wherein the division of the display screen and a selection of the plurality of applications are based on a following operation on the displayed divisional display information,
    the displayed divisional display information includes a region box different from the displayed windows of the selected plurality of applications,
    the region box indicates regions where the windows of the selected plurality of applications are displayed, and
    the following operation includes an operation that selects the plurality of applications for which the screen divisional display is to be executed; and
    updating the region box based on the following operation to depict where the windows of the selected plurality of applications are displayed.

* * * * *